US012414210B2

(12) United States Patent
Kober

(10) Patent No.: US 12,414,210 B2
(45) **Date of Patent: *Sep. 9, 2025**

(54) LOAD CONTROL DEVICE FOR A LIGHT-EMITTING DIODE LIGHT SOURCE HAVING DIFFERENT OPERATING MODES

(71) Applicant: Lutron Technology Company LLC, Coopersburg, PA (US)

(72) Inventor: Steven J. Kober, Center Valley, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/588,465

(22) Filed: Feb. 27, 2024

(65) Prior Publication Data

US 2024/0206033 A1 Jun. 20, 2024

Related U.S. Application Data

(63) Continuation of application No. 18/310,608, filed on May 2, 2023, now Pat. No. 11,950,336, which is a (Continued)

(51) Int. Cl.
*H05B 45/10* (2020.01)
*H05B 45/327* (2020.01)
(Continued)

(52) U.S. Cl.
CPC ........... *H05B 45/327* (2020.01); *H05B 45/10* (2020.01); *H05B 45/37* (2020.01); *H05B 45/382* (2020.01);
(Continued)

(58) Field of Classification Search
CPC ........ H05B 45/00; H05B 45/10; H05B 45/14; H05B 45/30; H05B 45/37; H05B 45/39; H05B 45/395; H05B 45/327
See application file for complete search history.

(56) References Cited

U.S. PATENT DOCUMENTS

| | | | |
|---|---|---|---|
| 4,845,481 | A | 7/1989 | Havel et al. |
| 5,017,837 | A | 5/1991 | Hanna et al. |

(Continued)

FOREIGN PATENT DOCUMENTS

| | | | |
|---|---|---|---|
| CN | 101127495 | A | 2/2008 |
| CN | 101897239 | A | 11/2010 |

(Continued)

OTHER PUBLICATIONS

Wikipedia, "Forward Converter", Available at <http://en.wikipedia.org/wiki/Forward_converter>, retrieved on Mar. 16, 2015, 2 pages.

*Primary Examiner* — Thai Pham
(74) *Attorney, Agent, or Firm* — Michael S. Czarnecki; Glen R. Farbanish; Philip N. Smith

(57) ABSTRACT

A load control device for regulating an average magnitude of a load current conducted through an electrical load may operate in different modes. The load control device may comprise a control circuit configured to activate an inverter circuit during an active state period and deactivate the inverter circuit during an inactive state period. In one mode, the control circuit may adjust the average magnitude of the load current by adjusting the inactive state period while keeping the active state period constant. In another mode, the control circuit may adjust the average magnitude of the load current by adjusting the active state period while keeping the inactive state period constant. In yet another mode, the control circuit may keep a duty cycle of the inverter circuit constant and regulate the average magnitude of the load current by adjusting a target load current conducted through the electrical load.

15 Claims, 13 Drawing Sheets

Related U.S. Application Data continuation of application No. 17/705,823, filed on Mar. 28, 2022, now Pat. No. 11,678,416, which is a continuation of application No. 17/224,265, filed on Apr. 7, 2021, now Pat. No. 11,291,093, which is a continuation of application No. 16/870,869, filed on May 8, 2020, now Pat. No. 10,986,709, which is a continuation of application No. 16/664,086, filed on Oct. 25, 2019, now Pat. No. 10,652,978, which is a continuation of application No. 16/402,318, filed on May 3, 2019, now Pat. No. 10,462,867, which is a continuation of application No. 16/118,419, filed on Aug. 30, 2018, now Pat. No. 10,306,723, which is a continuation of application No. 15/703,300, filed on Sep. 13, 2017, now Pat. No. 10,098,196.

(60) Provisional application No. 62/395,505, filed on Sep. 16, 2016.

(51) Int. Cl.
*H05B 45/37* (2020.01)
*H05B 45/382* (2020.01)
*H05B 45/39* (2020.01)
*H05B 45/395* (2020.01)
*H05B 45/14* (2020.01)

(52) U.S. Cl.
CPC ........... *H05B 45/39* (2020.01); *H05B 45/395* (2020.01); *H05B 45/14* (2020.01)

(56) References Cited

U.S. PATENT DOCUMENTS 5,041,763 A 8/1991 Sullivan et al.
5,399,940 A 3/1995 Hanna et al.
5,568,044 A 10/1996 Bittner
5,850,127 A 12/1998 Zhu et al.
6,016,038 A 1/2000 Mueller et al.
6,111,368 A 8/2000 Luchaco
6,150,771 A 11/2000 Perry
6,577,512 B2 6/2003 Tripathi et al.
6,580,258 B2 6/2003 Wilcox et al.
6,580,309 B2 6/2003 Jacobs et al.
6,586,890 B2 7/2003 Min et al.
6,707,264 B2 3/2004 Lin et al.
6,788,006 B2 9/2004 Yamamoto et al.
6,841,947 B2 1/2005 Berg-johansen et al.
7,061,191 B2 6/2006 Chitta
7,071,762 B2 7/2006 Xu et al.
7,102,339 B1 9/2006 Ferguson
7,102,340 B1 9/2006 Ferguson et al.
7,211,966 B2 5/2007 Green et al.
7,242,152 B2 7/2007 Dowling et al.
7,265,524 B2 9/2007 Jordan et al.
7,352,138 B2 4/2008 Lys et al.
7,420,333 B1 9/2008 Hamdad et al.
7,492,619 B2 2/2009 Yet et al.
7,535,183 B2 5/2009 Gurr et al.
7,642,734 B2 1/2010 De et al.
7,679,939 B2 3/2010 Gong et al.
7,759,881 B1 7/2010 Melanson et al.
7,791,584 B2 9/2010 Korcharz et al.
7,855,520 B2 12/2010 Leng et al.
7,863,827 B2 1/2011 Johnsen et al.
7,911,153 B2 3/2011 Srimuang et al.
7,923,939 B1 4/2011 Hamdad et al.
8,044,608 B2 10/2011 Kuo et al.
8,076,867 B2 12/2011 Kuo et al.
8,154,223 B2 4/2012 Hsu et al.
8,198,832 B2 6/2012 Bai et al.
8,217,591 B2 7/2012 Chobot et al.
8,258,710 B2 9/2012 Alexandrovich et al.
8,258,714 B2 9/2012 Liu et al.
8,283,875 B2 10/2012 Grotkowski et al.
8,288,967 B2 10/2012 Liu et al.
8,288,969 B2 10/2012 Hsu et al.
8,299,987 B2 10/2012 Neudorf et al.
8,310,845 B2 11/2012 Gaknoki et al.
8,319,448 B2 11/2012 Cecconello et al.
8,339,053 B2 12/2012 Yamasaki et al.
8,339,063 B2 12/2012 Lin et al.
8,339,066 B2 12/2012 Thornton et al.
8,339,067 B2 12/2012 Lin et al.
8,354,804 B2 1/2013 Otake et al.
8,368,322 B2 2/2013 Yu et al.
8,378,589 B2 2/2013 Kuo et al.
8,400,079 B2 3/2013 Kanamori et al.
8,427,081 B2 4/2013 Hsu et al.
RE44,228 E 5/2013 Park et al.
8,466,628 B2 6/2013 Shearer et al.
8,482,219 B2 7/2013 Kuo et al.
8,487,540 B2 7/2013 Dijkstra et al.
8,487,546 B2 7/2013 Melanson
8,492,982 B2 7/2013 Hagino et al.
8,492,987 B2 7/2013 Nuhfer et al.
8,492,988 B2 7/2013 Nuhfer et al.
8,508,150 B2 8/2013 Kuo et al.
8,541,952 B2 9/2013 Darshan et al.
8,558,474 B1 10/2013 Park et al.
8,558,518 B2 10/2013 Irissou et al.
8,581,511 B2 11/2013 Kim et al.
8,587,968 B2 11/2013 Zhu et al.
8,593,069 B2 11/2013 Kang et al.
8,598,804 B2 12/2013 Foxall et al.
8,624,526 B2 1/2014 Huang et al.
8,664,888 B2 3/2014 Nuhfer et al.
8,749,174 B2 6/2014 Angeles et al.
8,810,159 B2 8/2014 Nuhfer et al.
9,030,122 B2 5/2015 Lin et al.
9,048,723 B2 6/2015 Tsou et al.
9,231,485 B2 1/2016 Ryu et al.
9,245,734 B2 1/2016 Goscha et al.
9,247,608 B2 1/2016 Chitta et al.
9,295,119 B2 3/2016 Hiramatu et al.
9,538,600 B2 1/2017 Chitta et al.
9,565,731 B2 2/2017 DeJonge
9,655,180 B2 5/2017 Stevens, Jr. et al.
9,888,535 B2 2/2018 Chitta et al.
9,888,540 B2 2/2018 DeJonge
11,357,084 B2 * 6/2022 DeJonge ................ H05B 45/33
2004/0095114 A1 5/2004 Kernahan et al.
2006/0022916 A1 2/2006 Aiello et al.
2006/0082538 A1 4/2006 Oyama et al.
2006/0273772 A1 12/2006 Groom et al.
2007/0103086 A1 5/2007 Neudorf et al.
2008/0043504 A1 2/2008 Ye et al.
2008/0175029 A1 7/2008 Jung et al.
2009/0160360 A1 6/2009 Lim et al.
2009/0160422 A1 6/2009 Isobe et al.
2009/0243582 A1 10/2009 Irissou et al.
2010/0156319 A1 6/2010 Melanson et al.
2011/0080110 A1 4/2011 Nuhfer et al.
2012/0153920 A1 6/2012 Guenther et al.
2012/0200229 A1 8/2012 Kunst et al.
2013/0063047 A1 3/2013 Veskovic
2013/0063100 A1 3/2013 Henzler
2013/0141001 A1 6/2013 Datta et al.
2013/0154503 A1 6/2013 Decius et al.
2013/0229829 A1 9/2013 Zhang et al.
2013/0234612 A1 9/2013 Zeng et al.
2013/0278145 A1 10/2013 Lin et al.
2014/0009084 A1 1/2014 Veskovic et al.
2014/0009085 A1 1/2014 Veskovic et al.
2014/0062330 A1 3/2014 Neundorfer et al.
2014/0103894 A1 4/2014 McJimsey et al.
2014/0184076 A1 7/2014 Murphy et al.
2014/0265935 A1 9/2014 Sadwick et al.
2014/0312796 A1 10/2014 Sauerländer et al.
2014/0354170 A1 * 12/2014 Gredler .................. H05B 45/10
315/224
2015/0028778 A1 1/2015 Zudrell-Koch
2015/0257214 A1 9/2015 Li et al.

(56) References Cited

U.S. PATENT DOCUMENTS

| | | | |
|---|---|---|---|
| 2016/0212815 A1 | 7/2016 | Watanabe et al. | |
| 2016/0365799 A1 | 12/2016 | Nakano et al. | |
| 2016/0374164 A1* | 12/2016 | Stevens, Jr. | H05B 45/3725 |
| 2017/0104411 A1 | 4/2017 | Mohamed et al. | |
| 2017/0126949 A1 | 5/2017 | Dorai et al. | |
| 2017/0127486 A1 | 5/2017 | Lee et al. | |
| 2017/0238386 A1 | 8/2017 | Stevens, Jr. et al. | |
| 2017/0250620 A1* | 8/2017 | White | H02M 1/4258 |
| 2018/0084616 A1* | 3/2018 | Kober | H05B 45/395 |
| 2018/0160493 A1* | 6/2018 | Picard | H05B 45/00 |

FOREIGN PATENT DOCUMENTS

| | | | |
|---|---|---|---|
| CN | 102612227 | A | 7/2012 |
| CN | 102752907 | A | 10/2012 |
| CN | 103001486 | A | 3/2013 |
| CN | 103296892 | A | 9/2013 |
| DE | 102009041943 | A1 | 3/2011 |
| DE | 102016100710 | A1 | 1/2016 |
| EP | 1635445 | A2 | 3/2006 |
| EP | 2383873 | B1 | 4/2010 |
| EP | 2579684 | A1 | 4/2012 |
| EP | 2515611 | A1 | 10/2012 |
| JP | 2001093662 | A | 4/2001 |
| WO | 2008011041 | A2 | 1/2008 |
| WO | 2015070099 | A1 | 5/2015 |

* cited by examiner

LOAD CONTROL DEVICE FOR A LIGHT-EMITTING DIODE LIGHT SOURCE HAVING DIFFERENT OPERATING MODES

CROSS-REFERENCE TO RELATED APPLICATIONS

This application is a continuation of U.S. patent application Ser. No. 18/310,608, filed May 2, 2023; which is a continuation of U.S. patent application Ser. No. 17/705,823, filed Mar. 28, 2022, now U.S. Pat. No. 11,678,416, issued Jun. 13, 2023; which is a continuation of U.S. patent application Ser. No. 17/224,265, filed on Apr. 7, 2021, now U.S. Pat. No. 11,291,093, issued Mar. 29, 2022; which is a continuation of U.S. patent application Ser. No. 16/870,869, filed May 8, 2020, now U.S. Pat. No. 10,986,709, issued on Apr. 20, 2021; which is a continuation of U.S. patent application Ser. No. 16/664,086, filed Oct. 25, 2019, now U.S. Pat. No. 10,652,978, issued on May 12, 2020; which is a continuation of U.S. patent application Ser. No. 16/402,318, filed May 3, 2019, now U.S. Pat. No. 10,462,867, issued on Oct. 29, 2019; which is a continuation of U.S. patent application Ser. No. 16/118,419, filed Aug. 30, 2018, now U.S. Pat. No. 10,306,723, issued on May 28, 2019; which is a continuation of U.S. patent application Ser. No. 15/703,300, filed Sep. 13, 2017, now U.S. Pat. No. 10,098,196, issued on Oct. 9, 2018; which claims the benefit of U.S. Provisional Patent Application No. 62/395,505, filed Sep. 16, 2016, the entire disclosures of which are hereby incorporated by reference.

BACKGROUND

Light-emitting diode (LED) light sources (e.g., LED light engines) are replacing conventional incandescent, fluorescent, and halogen lamps as a primary form of lighting devices. LED light sources may comprise a plurality of light-emitting diodes mounted on a single structure and provided in a suitable housing. LED light sources may be more efficient and provide longer operational lives as compared to incandescent, fluorescent, and halogen lamps. An LED driver control device (e.g., an LED driver) may be coupled between an alternating-current (AC) power source and an LED light source for regulating the power supplied to the LED light source. For example, the LED driver may regulate the voltage provided to the LED light source, the current supplied to the LED light source, or both the current and voltage.

Different control techniques may be employed to drive LED light sources including, for example, a current load control technique and a voltage load control technique. An LED light source driven by the current load control technique may be characterized by a rated current (e.g., approximately 350 milliamps) to which the peak magnitude of the current through the LED light source may be regulated to ensure that the LED light source is illuminated to the appropriate intensity and/or color. An LED light source driven by the voltage load control technique may be characterized by a rated voltage (e.g., approximately 15 volts) to which the voltage across the LED light source may be regulated to ensure proper operation of the LED light source. If an LED light source rated for the voltage load control technique includes multiple parallel strings of LEDs, a current balance regulation element may be used to ensure that the parallel strings have the same impedance so that the same current is drawn in each of the parallel strings.

The light output of an LED light source may be dimmed. Methods for dimming an LED light source may include, for example, a pulse-width modulation (PWM) technique and a constant current reduction (CCR) technique. In pulse-width modulation dimming, a pulsed signal with a varying duty cycle may be supplied to the LED light source. For example, if the LED light source is being controlled using a current load control technique, the peak current supplied to the LED light source may be kept constant during an on time of the duty cycle of the pulsed signal. The duty cycle of the pulsed signal may be varied, however, to vary the average current supplied to the LED light source, thereby changing the intensity of the light output of the LED light source. As another example, if the LED light source is being controlled using a voltage load control technique, the voltage supplied to the LED light source may be kept constant during the on time of the duty cycle of the pulsed signal. The duty cycle of the load voltage may be varied, however, to adjust the intensity of the light output. Constant current reduction dimming may be used if an LED light source is being controlled using the current load control technique. In constant current reduction dimming, current may be continuously provided to the LED light source. The DC magnitude of the current provided to the LED light source, however, may be varied to adjust the intensity of the light output. Examples of LED drivers are described in greater detail in commonly-assigned U.S. Pat. No. 8,492,987, issued Jul. 23, 2010, and U.S. Patent Application Publication No. 2013/0063047, published Mar. 14, 2013, both entitled LOAD CONTROL DEVICE FOR A LIGHT-EMITTING DIODE LIGHT SOURCE, the entire disclosures of which are hereby incorporated by reference.

Dimming an LED light source using traditional techniques may result in changes in the light intensity that are perceptible to the human vision. This problem may be more apparent if the dimming occurs while the LED light source is near a low end of its intensity range (e.g., below 5% of a rated peak intensity). Accordingly, methods and apparatus for fine dimming of an LED light source may be desirable.

SUMMARY

As described herein, a load control device for controlling the amount of power delivered to an electrical load may comprise a load regulation circuit. The load regulation circuit may be configured to control a magnitude of a load current conducted through the electrical load in order to control the amount of power delivered to the electrical load. The load regulation circuit may comprise an inverter circuit characterized by a burst duty cycle. The burst duty cycle may represent a ratio of an active state period in which the inverter circuit is activated and an inactive state period in which the inverter circuit is deactivated. The load control device may further comprise a control circuit coupled to the load regulation circuit and configured to control an average magnitude of the load current conducted through the electrical load. The control circuit may be configured to activate the inverter circuit during the active state period and deactivate the inverter circuit during the inactive state period. The control circuit may be further configured to operate in at least a low-end mode, an intermediate mode, and a normal mode. During the low-end mode, the control circuit is configured to keep the length of the active state period constant and adjust the length of the inactive state period in order to adjust the burst duty cycle of the inverter circuit and the average magnitude of the load current. During the intermediate mode, the control circuit is configured to keep the length of the inactive state period constant and adjust the length of the active state period in order to adjust the burst duty cycle of the inverter circuit and the average magnitude of the load current. During the normal mode, the control circuit is configured to regulate the average magnitude of the load current by holding the burst duty cycle constant and adjusting a target load current conducted through the electrical load.

Also described herein is an LED driver for controlling an intensity of an LED light source. The LED driver may comprise an LED drive circuit configured to control a magnitude of a load current conducted through the LED light source in order to achieve a target intensity of the LED light source. The LED drive circuit may in turn comprise an inverter circuit characterized by a burst duty cycle. The burst duty cycle may represent a ratio of an active state period in which the inverter circuit is activated and an inactive state period in which the inverter circuit is deactivated.

The LED driver may further comprise a control circuit coupled to the LED drive circuit and configured to control an average magnitude of the load current. The control circuit may be configured to activate the inverter circuit during the active state period and deactivate the inverter circuit during the inactive state period. The control circuit may be further configured to operate in a burst mode and a normal mode. During the normal mode, the control circuit may be configured to regulate the average magnitude of the load current by holding the burst duty cycle constant and adjusting a target load current conducted through the LED light source. During the burst mode, the control circuit may be configured to adjust the burst duty cycle and the average magnitude of the load current by keeping the length of the active state period constant and adjusting a length of the inactive state periods if the target intensity of the LED light source is within a first intensity range. During the burst mode, the control circuit may be configured to adjust the burst duty cycle and the average magnitude of the load current by keeping the length of the inactive state period constant and adjusting the length of the active state period if the target intensity of the LED light source is within a second intensity range. The second intensity range may be above the first intensity range in terms of intensity levels comprised in the respective intensity ranges. For example, the first intensity range may comprise intensity levels that are between 1% and 4% of a maximum rated intensity of the LED light source, and the second intensity range may comprise intensity levels that are between 4% and 5% of the maximum rated intensity of the LED light source.

DETAILED DESCRIPTION

Figure 1:
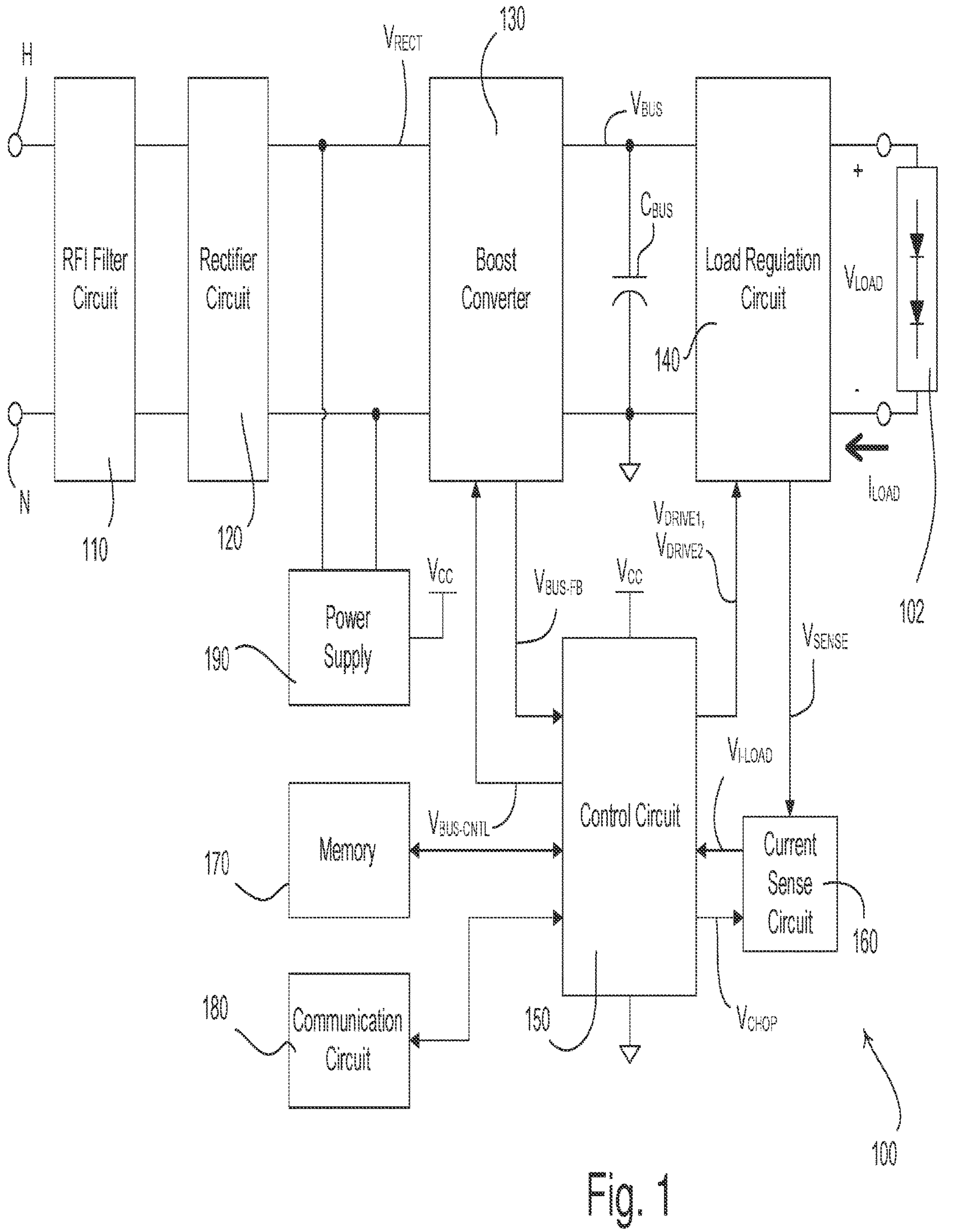
FIG. 1 is a simplified block diagram of a light-emitting diode (LED) driver for controlling the intensity of an LED light source.

FIG. 1 is a simplified block diagram of a load control device, e.g., a light-emitting diode (LED) driver 100, for controlling the amount of power delivered to an electrical load, such as, an LED light source 102 (e.g., an LED light engine), and thus the intensity of the electrical load. The LED light source 102 is shown as a plurality of LEDs connected in series but may comprise a single LED or a plurality of LEDs connected in parallel or a suitable combination thereof, depending on the particular lighting system. The LED light source 102 may comprise one or more organic light-emitting diodes (OLEDs). The light source 102 may comprise one or more quantum dot light-emitting diodes (QLEDs). The LED driver 100 may comprise a hot terminal H and a neutral terminal. The terminals may be adapted to be coupled to an alternating-current (AC) power source (not shown).

The LED driver 100 may comprise a radio-frequency interference (RFI) filter circuit 110, a rectifier circuit 120, a boost converter 130, a load regulation circuit 140, a control circuit 150, a current sense circuit 160, a memory 170, a communication circuit 180, and/or a power supply 190. The RFI filter circuit 110 may minimize the noise provided on the AC mains. The rectifier circuit 120 may generate a rectified voltage $V_{RECT}$.

The boost converter 130 may receive the rectified voltage $V_{RECT}$ and generate a boosted direct-current (DC) bus voltage $V_{BUS}$ across a bus capacitor $C_{BUS}$. The boost converter 130 may comprise any suitable power converter circuit for generating an appropriate bus voltage, such as, for example, a flyback converter, a single-ended primary-inductor converter (SEPIC), a Ćuk converter, or other suitable power converter circuit. The boost converter 120 may operate as a power factor correction (PFC) circuit to adjust the power factor of the LED driver 100 towards a power factor of one.

The load regulation circuit 140 may receive the bus voltage $V_{BUS}$ and control the amount of power delivered to the LED light source 102, for example, to control the intensity of the LED light source 102 between a low-end (e.g., minimum) intensity $L_{LE}$ (e.g., approximately 1-5%) and a high-end (e.g., maximum) intensity $L_{HE}$ (e.g., approximately 100%). An example of the load regulation circuit 140 may be an isolated, half-bridge forward converter. An example of the load control device (e.g., LED driver 100) comprising a forward converter is described in greater detail in commonly-assigned U.S. patent application Ser. No. 13/935,799, filed Jul. 5, 2013, entitled LOAD CONTROL DEVICE FOR A LIGHT-EMITTING DIODE LIGHT SOURCE, the entire disclosure of which is hereby incorporated by reference. The load regulation circuit 140 may comprise, for example, a buck converter, a linear regulator, or any suitable LED drive circuit for adjusting the intensity of the LED light source 102.

The control circuit 150 may be configured to control the operation of the boost converter 130 and/or the load regulation circuit 140. An example of the control circuit 150 may be a controller. The control circuit 150 may comprise, for example, a digital controller or any other suitable processing device, such as, for example, a microcontroller, a programmable logic device (PLD), a microprocessor, an application specific integrated circuit (ASIC), or a field-programmable gate array (FPGA). The control circuit 150 may generate a bus voltage control signal $V_{BUS-CNTL}$, which may be provided to the boost converter 130 for adjusting the magnitude of the bus voltage $V_{BUS}$. The control circuit 150 may receive a bus voltage feedback control signal $V_{BUS-FB}$ from the boost converter 130, which may indicate the magnitude of the bus voltage $V_{BUS}$.

The control circuit 150 may generate drive control signals $V_{DRIVE1}$, $V_{DRIVE2}$. The drive control signals $V_{DRIVE1}$, $V_{DRIVE2}$ may be provided to the load regulation circuit 140 for adjusting the magnitude of a load voltage $V_{LOAD}$ generated across the LED light source 102 and/or the magnitude of a load current $I_{LOAD}$ conducted through the LED light source 120. By controlling the load voltage $V_{LOAD}$ and/or the load current $I_{LOAD}$, the control circuit may control the intensity of the LED light source 120 to a target intensity $L_{TRGT}$. The control circuit 150 may adjust an operating frequency $f_{OP}$ and/or a duty cycle $DC_{INV}$ (e.g., an on time $T_{ON}$) of the drive control signals $V_{DRIVE1}$, $V_{DRIVE2}$ in order to adjust the magnitude of the load voltage $V_{LOAD}$ and/or the load current $I_{LOAD}$.

The current sense circuit 160 may receive a sense voltage $V_{SENSE}$. The sense voltage $V_{SENSE}$ may be generated by the load regulation circuit 140. The sense voltage $V_{SENSE}$ may indicate the magnitude of the load current $I_{LOAD}$. The current sense circuit 160 may receive a signal-chopper control signal $V_{CHOP}$ from the control circuit 150. The current sense circuit 160 may generate a load current feedback signal $V_{I-LOAD}$, which may be a DC voltage indicating the average magnitude $I_{AVE}$ of the load current $I_{LOAD}$. The control circuit 150 may receive the load current feedback signal $V_{I-LOAD}$ from the current sense circuit 160. The control circuit 150 may adjust the drive control signals $V_{DRIVE1}$, $V_{DRIVE2}$ based on the load current feedback signal $V_{I-LOAD}$ so that the magnitude of the load current $I_{LOAD}$ may be adjusted towards a target load current $I_{TRGT}$. For example, the control circuit 150 may set initial operating parameters for the drive control signals $V_{DRIVE1}$, $V_{DRIVE2}$ (e.g., an operating frequency $f_{OP}$ and/or a duty cycle $DC_{INV}$). The control circuit 150 may receive the load current feedback signal $V_{I-LOAD}$ indicating the effect of the drive control signals $V_{DRIVE1}$, $V_{DRIVE2}$. Based on the indication, the control circuit 150 may adjust the operating parameters of the drive control signals to thus adjust the magnitude of the load current $I_{LOAD}$ towards a target load current $I_{TRGT}$ (e.g., using a control loop).

The load current $I_{LOAD}$ may be the current that is conducted through the LED light source 102. The target load current $I_{TRGT}$ may be the current that the control circuit 150 aims to conduct through the LED light source 102 (e.g., based at least on the load current feedback signal $V_{I-LOAD}$). The load current $I_{LOAD}$ may be approximately equal to the target load current $I_{TRGT}$ but may not always follow the target load current $T_{TRGT}$. This may be because, for example, the control circuit 150 may have specific levels of granularity in which it can control the current conducted through the LED light source 102 (e.g., due to inverter cycle lengths, etc.). Non-ideal reactions of the LED light source 102 (e.g., an overshoot in the load current $I_{LOAD}$) may also cause the load current $I_{LOAD}$ to deviate from the target load current $I_{TRGT}$. A person skilled in the art will appreciate that the figures shown herein (e.g., FIGS. 2 and 13) that illustrate the current conducted through an LED light source as a linear graph illustrate the target load current $I_{TRGT}$ since the load current $I_{LOAD}$ itself may not actually follow a true linear path.

The control circuit 150 may be coupled to the memory 170. The memory 170 may store operational characteristics of the LED driver 100 (e.g., the target intensity $L_{TRGT}$, the low-end intensity $L_{LE}$, the high-end intensity $L_{HE}$, etc.). The communication circuit 180 may be coupled to, for example, a wired communication link or a wireless communication link, such as a radio-frequency (RF) communication link or an infrared (IR) communication link. The control circuit 150 may be configured to update the target intensity $L_{TRGT}$ of the LED light source 102 and/or the operational characteristics stored in the memory 170 in response to digital messages received via the communication circuit 180. The LED driver 100 may be operable to receive a phase-control signal from a dimmer switch for determining the target intensity $L_{TRGT}$ for the LED light source 102. The power supply 190 may receive the rectified voltage $V_{RECT}$ and generate a direct-current (DC) supply voltage $V_{CC}$ for powering the circuitry of the LED driver 100.

Figure 2:
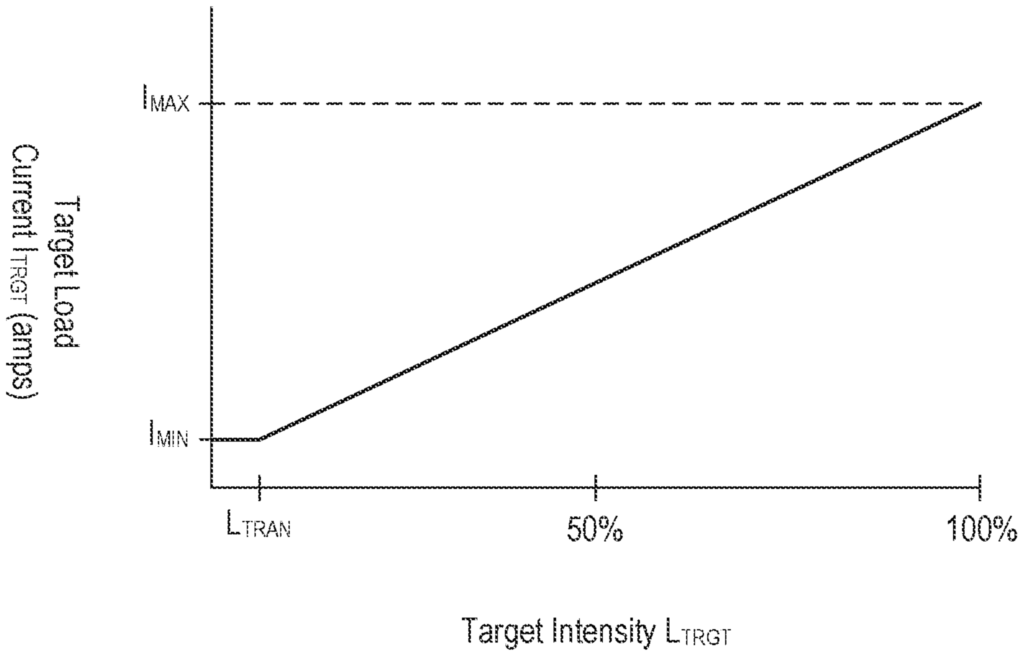
FIG. 2 is an example plot of a target load current of the LED driver of FIG. 1 as a function of a target intensity.

FIG. 2 is an example plot of the target load current $I_{TRGT}$ as a function of the target intensity $L_{TRGT}$. As shown, a linear relationship may exist between the target intensity $L_{TRGT}$ and the target load current $I_{TRGT}$ (e.g., in at least an ideal situation). For example, to achieve a higher target intensity, the control circuit 150 may increase the target load current $I_{TRGT}$ (e.g., in proportion to the increase in the target intensity); to achieve a lower target intensity, the control circuit 150 may decrease the target load current $I_{TRGT}$ (e.g., in proportion to the decrease in the target intensity). As the target load current $I_{TRGT}$ is being adjusted, the magnitude of the load current $I_{LOAD}$ may change accordingly. There may be limits, however, to how much the load current $I_{LOAD}$ may be adjusted. For example, the load current $I_{LOAD}$ may not be adjusted above a maximum rated current $I_{MAX}$ or below a minimum rated current $T_{MIN}$ (e.g., due to hardware limitations of the load regulation circuit 140 and/or the control circuit 150). Therefore, the control circuit 150 may be configured to adjust the target load current $I_{TRGT}$ between the minimum rated current $I_{MIN}$ and a maximum rated current $I_{MAX}$ so that the magnitude of the load current $I_{LOAD}$ may fall in the same range. The maximum rated current $I_{MAX}$ may correspond to a high-end intensity $L_{HE}$ (e.g., approximately 100%). The minimum rated current $I_{MIN}$ may correspond to a transition intensity $L_{TRAN}$ (e.g., approximately 5%). Between the high-end intensity $L_{HE}$ and the transition intensity $L_{TRAN}$, the control circuit 150 may operate the load regulation circuit 140 in a normal mode in which an average magnitude $I_{AVE}$ of the load current $I_{LOAD}$ may be controlled to be equal (e.g., approximately equal) to the target load current $I_{TRGT}$. During the normal mode, the control circuit 150 may control the average magnitude $I_{AVE}$ of the load current $I_{LOAD}$ to the target load current $I_{TRGT}$ in response to the load current feedback signal $V_{I\text{-}LOAD}$ (e.g., using closed loop control), for example.

To adjust the average magnitude $I_{AVE}$ of the load current $I_{LOAD}$ to below the minimum rated current $I_{MIN}$ (and to thus adjust the target intensity $L_{TRGT}$ below the transition intensity $L_{TRAN}$), the control circuit 150 may be configured to operate the load regulation circuit 140 in a burst mode. The burst mode may be characterized by a burst operating period that includes an active state period and an inactive state period. During the active state period, the control circuit 150 may be configured to regulate the load current $I_{LOAD}$ in ways similar to those in the normal mode. During the inactive state period, the control circuit 150 may be configured to stop regulating the load current $I_{LOAD}$ (e.g., to allow the load current $I_{LOAD}$ to drop to approximately zero). The ratio of the active state period to the burst operating period, e.g., $T_{ACTIVE}/T_{BURST}$, may represent a burst duty cycle $DC_{BURST}$. The burst duty cycle $DC_{BURST}$ may be controlled between a maximum duty cycle $DC_{MAX}$ (e.g., approximately 100%) and a minimum duty cycle $DC_{MIN}$ (e.g., approximately 20%). The load current $I_{LOAD}$ may be adjusted towards the target current $I_{TRGT}$ (e.g., the minimum rated current $I_{MIN}$) during the active state period of the burst mode. Setting the burst duty cycle $DC_{BURST}$ to a value less than the maximum duty cycle $DC_{MAX}$ may reduce the average magnitude $I_{AVE}$ of the load current $I_{LOAD}$ to below the minimum rated current $I_{MIN}$.

Figure 3:
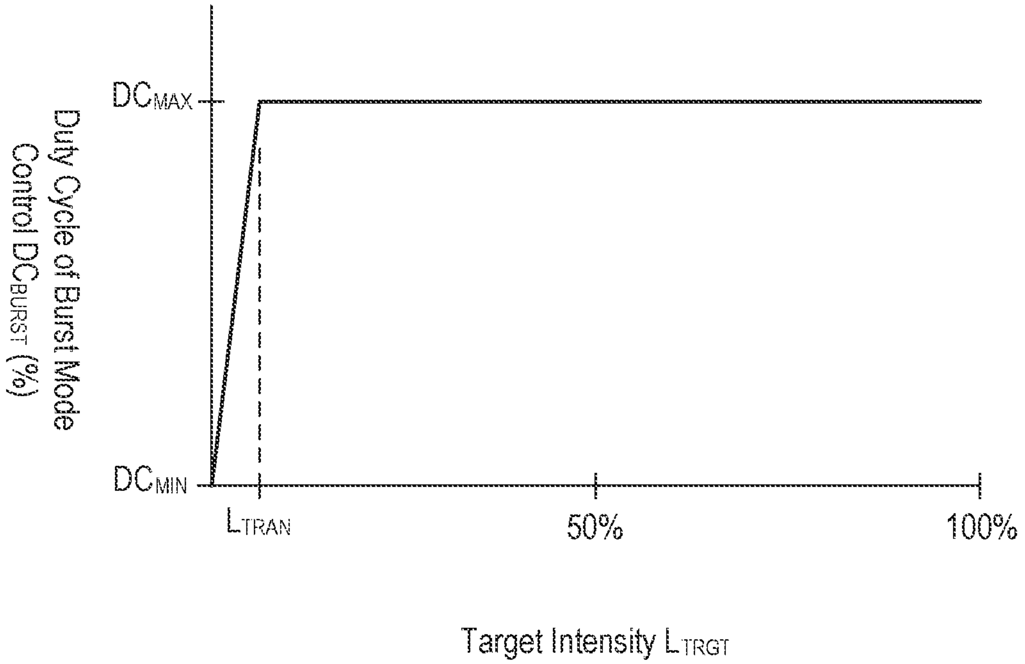
FIG. 3 is an example plot of a burst duty cycle of the LED driver of FIG. 1 as a function of the target intensity.

FIG. 3 is an example plot of a burst duty cycle $DC_{BURST}$ (e.g., an ideal burst duty cycle $DC_{BURST\text{-}IDEAL}$) as a function of the target intensity $L_{TRGT}$. As described herein, when the target intensity $L_{TRGT}$ is between the high-end intensity $L_{HE}$ (e.g., approximately 100%) and the transition intensity $L_{TRAN}$ (e.g., approximately 5%), the control circuit 150 may be configured to operate the load regulation circuit 140 in the normal mode, e.g., by setting the burst duty cycle $DC_{BURST}$ at a constant value that is equal to approximately a maximum duty cycle $DC_{MAX}$ or approximately 100%. To adjust the target intensity $L_{TRGT}$ below the transition intensity $L_{TRAN}$, the control circuit 150 may be configured to operate the load regulation circuit 140 in the burst mode, e.g., by adjusting the burst duty cycle $DC_{BURST}$ between the maximum duty cycle $DC_{MAX}$ and the minimum duty cycle $DC_{MIN}$ (e.g., approximately 20%).

With reference to FIG. 3, the burst duty cycle $DC_{BURST}$ may refer to an ideal burst duty cycle $DC_{BURST\text{-}IDEAL}$, which may include an integer portion $DC_{BURST\text{-}INTEGER}$ and/or a fractional portion $DC_{BURST\text{-}FRACTIONAL}$. The integer portion $DC_{BURST\text{-}INTEGER}$ may be characterized by the percentage of the ideal burst duty cycle $DC_{BURST\text{-}IDEAL}$ that includes complete inverter cycles (e.g., an integer value of inverter cycles). The fractional portion $DC_{BURST\text{-}FRACTIONAL}$ may be characterized by the percentage of the ideal burst duty cycle $DC_{BURST\text{-}IDEAL}$ that includes a fraction of an inverter cycle. In at least some cases, the control circuit 150 (e.g., via the load regulation circuit 140) may be configured to adjust the number of inverter cycles by an integer number (e.g., by $DC_{BURST\text{-}INTEGER}$) and not a fractional amount (e.g., $DC_{BURST\text{-}FRACTIONAL}$). Therefore, although the example plot of FIG. 3 illustrates an ideal curve showing continuous adjustment of the ideal burst duty cycle $DC_{BURST\text{-}IDEAL}$ from a maximum duty cycle $DC_{MAX}$ to a minimum duty cycle $DC_{MIN}$, unless defined differently, burst duty cycle $DC_{BURST}$ may refer to the integer portion $DC_{BURST\text{-}INTEGER}$ of the ideal burst duty cycle $DC_{BURST\text{-}IDEAL}$ (e.g., if the control circuit 150 is not be configured to operate the burst duty cycle $DC_{BURST}$ at fractional amounts).

Figure 4:
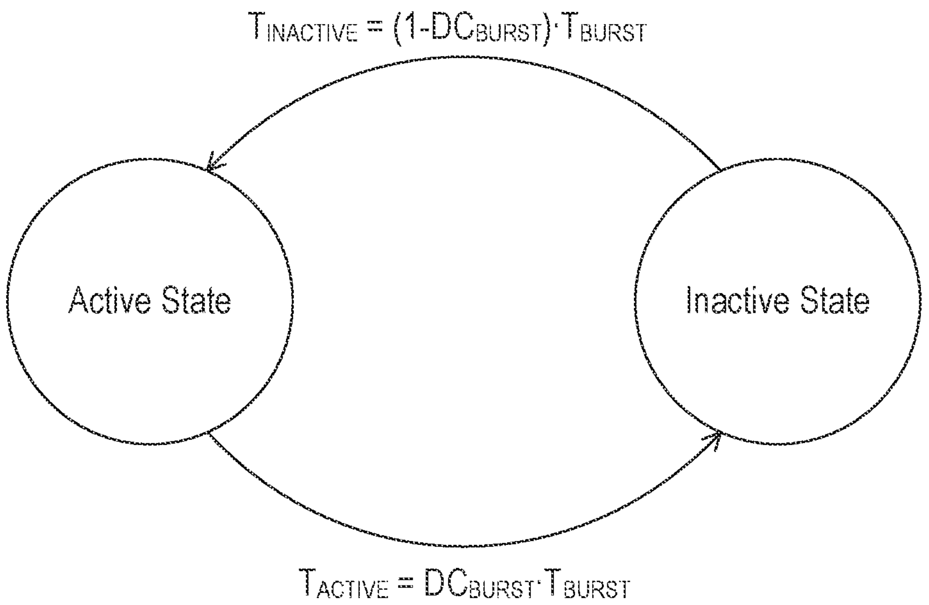
FIG. 4 is an example state diagram illustrating the operation of a load regulation circuit of the LED driver of FIG. 1 when operating in a burst mode.

FIG. 4 is an example state diagram illustrating the operation of the load regulation circuit 140 in the burst mode. During the burst mode, the control circuit 150 may periodically control the load regulation circuit 140 into an active state and an inactive state, e.g., in dependence upon a burst duty cycle $DC_{BURST}$ and a burst mode period $T_{BURST}$ (e.g., approximately 4.4 milliseconds). For example, the active state period $T_{ACTIVE}$ may be equal to the burst duty cycle $DC_{BURST}$ times the burst mode period $T_{BURST}$ and the inactive state period $T_{INACTIVE}$ may be equal to one minus the burst duty cycle $DC_{BURST}$ times the burst mode period $T_{BURST}$. That is, $T_{ACTIVE}=DC_{BURST}-T_{BURST}$ and $T_{INACTIVE}=(1-DC_{BURST})-T_{BURST}$.

In the active state of the burst mode, the control circuit 150 may be configured to generate the drive control signals $V_{DRIVE1}$, $V_{DRIVE2}$. The control circuit 150 may be further configured to adjust the operating frequency $f_{OP}$ and/or the duty cycle $DC_{INV}$ (e.g., an on time $T_{ON}$) of the drive control signals $V_{DRIVE1}$, $V_{DRIVE2}$ to adjust the magnitude of the load current $I_{LOAD}$. The control circuit 150 may be configured to make the adjustments using closed loop control. For example, in the active state of the burst mode, the control circuit 150 may generate the drive signals $V_{DRIVE1}$, $V_{DRIVE2}$ to adjust the magnitude of the load current $I_{LOAD}$ to be equal to a target load current $I_{TRGT}$ (e.g., the minimum rated current $I_{MIN}$) in response to the load current feedback signal $V_{I\text{-}LOAD}$.

In the inactive state of the burst mode, the control circuit 150 may let the magnitude of the load current $I_{LOAD}$ drop to approximately zero amps, e.g., by freezing the closed loop control and/or not generating the drive control signals $V_{DRIVE1}$, $V_{DRIVE2}$. While the control loop is frozen (e.g., in the inactive state), the control circuit 150 may stop responding to the load current feedback signal $V_{I\text{-}LOAD}$ (e.g., the control circuit 150 may not adjust the values of the operating frequency $f_{OP}$ and/or the duty cycle $DC_{INV}$ in response to the load current feedback signal). The control circuit 150 may store the present duty cycle $DC_{INV}$ (e.g., the present on time $T_{ON}$) of the drive control signals $V_{DRIVE1}$, $V_{DRIVE2}$ in the memory 170 prior to (e.g., immediately prior to) freezing the control loop. When the control loop is unfrozen (e.g., when the control circuit 150 enters the active state), the control circuit 150 may resume generating the drive control signals $V_{DRIVE1}$, $V_{DRIVE2}$ using the operating frequency $f_{OP}$ op and/or the duty cycle $DC_{INV}$ from the previous active state.

The control circuit 150 may be configured to adjust the burst duty cycle $DC_{BURST}$ using an open loop control. For example, the control circuit 150 may be configured to adjust the burst duty cycle $DC_{BURST}$ as a function of the target intensity $L_{TRGT}$ when the target intensity $L_{TRGT}$ is below the transition intensity $L_{TRAN}$. For example, the control circuit 150 may be configured to linearly decrease the burst duty cycle $DC_{BURST}$ as the target intensity $L_{TRGT}$ is decreased below the transition intensity $L_{TRAN}$ (e.g., as shown in FIG. 3), while the target load current $I_{TRGT}$ is held constant at the minimum rated current $I_{MIN}$ (e.g., as shown in FIG. 2). Since the control circuit 150 may switch between the active state and the inactive state in dependence upon the burst duty cycle $DC_{BURST}$ and the burst mode period $T_{BURST}$ (e.g., as shown in the state diagram of FIG. 4), the average magnitude $I_{AVE}$ of the load current $I_{LOAD}$ may change as a function of the burst duty cycle $DC_{BURST}$ (e.g., $I_{AVE}=DC_{BURST}-I_{MIN}$). In other words, during the burst mode, the peak magnitude $I_{PK}$ of the load current $I_{LOAD}$ may be equal to the minimum rated current $I_{MIN}$, but the average magnitude $I_{AVE}$ of the load current $I_{LOAD}$ may be less than the minimum rated current $I_{MIN}$, depending on the value of the burst duty cycle $DC_{BURST}$.

Figure 5:
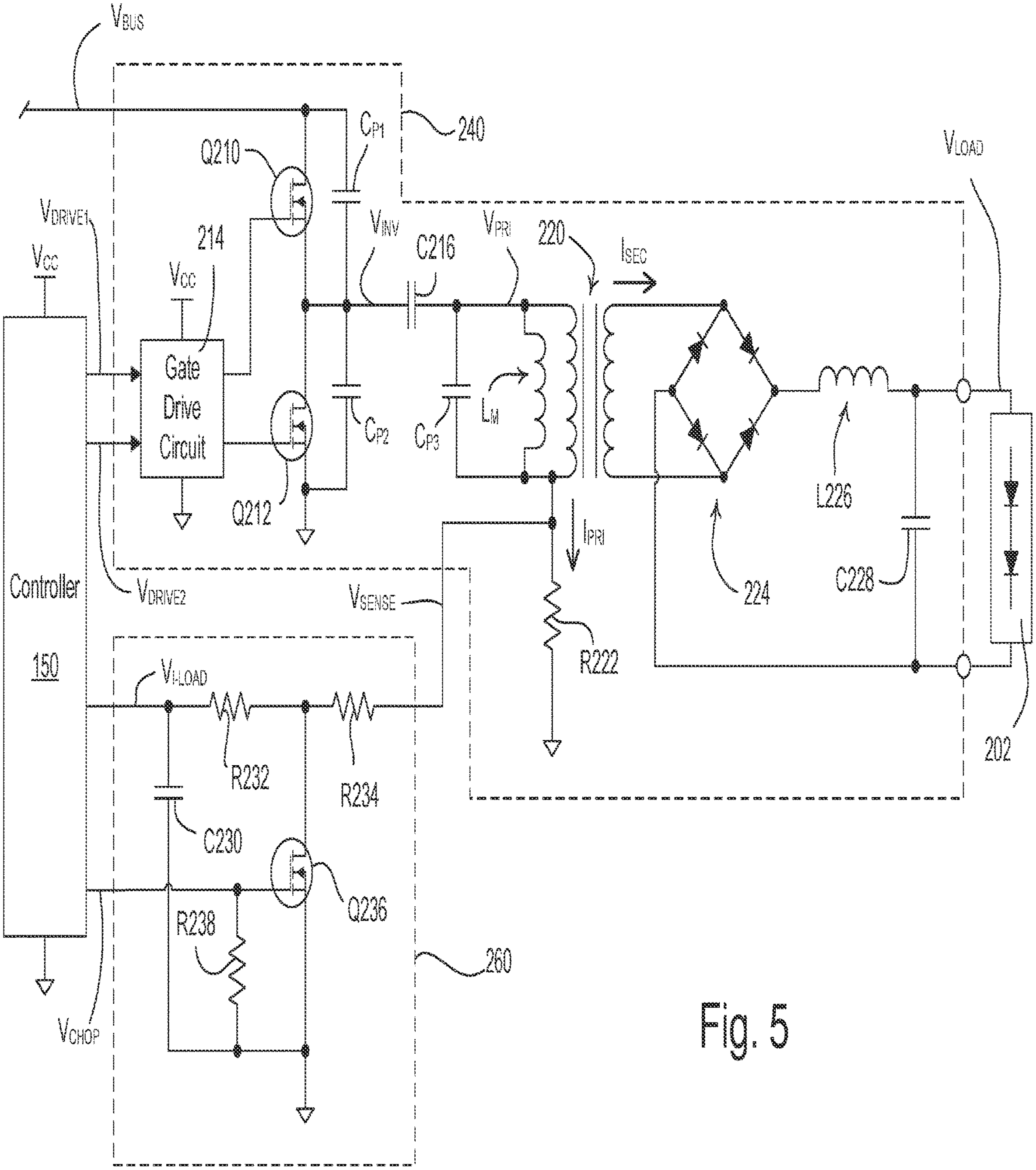
FIG. 5 is a simplified schematic diagram of an isolated forward converter and a current sense circuit of an LED driver.

FIG. 5 is a simplified schematic diagram of a forward converter 240 and a current sense circuit 260 of an LED driver (e.g., the LED driver 100 shown in FIG. 1). The forward converter 240 may be an example of the load regulation circuit 140 of the LED driver 100 shown in FIG. 1. The current sense circuit 260 may be an example of the current sense circuit 160 of the LED driver 100 shown in FIG. 1.

The forward converter 240 may comprise a half-bridge inverter circuit having two field effect transistors (FETs) Q210, Q212 for generating a high-frequency inverter voltage $V_{INV}$, e.g., from the bus voltage $V_{BUS}$. The FETs Q210, Q212 may be rendered conductive and non-conductive in response to the drive control signals $V_{DRIVE1}$, $V_{DRIVE2}$. The drive control signals $V_{DRIVE1}$, $V_{DRIVE2}$ may be received from the control circuit 150. The drive control signals $V_{DRIVE1}$, $V_{DRIVE2}$ may be coupled to the gates of the respective FETs Q210, Q212 via a gate drive circuit 214 (e.g., which may comprise part number L6382DTR, manufactured by ST Microelectronics). The control circuit 150 may be configured to generate the inverter voltage $V_{INV}$ at an operating frequency $f_{OP}$ (e.g., approximately 60-65 kHz) and thus an operating period $T_{OP}$. The control circuit 150 may be configured to adjust the operating frequency $f_{OP}$ under certain operating conditions. For example, the control circuit 150 may be configured to decrease the operating frequency near the high-end intensity $L_{HE}$. The control circuit 150 may be configured to adjust a duty cycle $DC_{INV}$ of the inverter voltage $V_{INV}$ (e.g., with or without also adjusting the operating frequency) to control the intensity of an LED light source 202 towards the target intensity $L_{TRGT}$.

In a normal mode of operation, when the target intensity $L_{TRGT}$ of the LED light source 202 is between the high-end intensity $L_{HE}$ and the transition intensity $L_{TRAN}$, the control circuit 150 may adjust the duty cycle $DC_{INV}$ of the inverter voltage $V_{INV}$ to adjust the magnitude of the load current $I_{LOAD}$ (e.g., the average magnitude $I_{AVE}$) towards the target load current $I_{TRGT}$. The magnitude of the load current $I_{LOAD}$ may vary between the maximum rated current $I_{MAX}$ and the minimum rated current $I_{MIN}$ (e.g., as shown in FIG. 2). The minimum rated current $I_{MIN}$ may be determined, for example, based on a minimum on time $T_{ON-MIN}$ of the half-bridge inverter circuit of the forward converter 240. The minimum on time $T_{ON-MIN}$ may vary based on hardware limitations of the forward converter. At the minimum rated current $I_{MIN}$ (e.g., at the transition intensity $L_{TRAN}$), the inverter voltage $V_{INV}$ may be characterized by a low-end operating frequency $f_{OP-LE}$ and a low-end operating period $T_{OP-LE}$.

When the target intensity $L_{TRGT}$ of the LED light source 202 is below the transition intensity $L_{TRAN}$, the control circuit 150 may be configured to operate the forward converter 240 in a burst mode of operation. In addition to or in lieu of using target intensity as a threshold for determining when to operate in burst mode, the control circuit 150 may use power (e.g., a transition power) and/or current (e.g., a transition current) as the threshold. In the burst mode of operation, the control circuit 150 may be configured to switch the forward converter 240 between an active state (e.g., in which the control circuit 150 may actively generate the drive control signals $V_{DRIVE1}$, $V_{DRIVE2}$ to regulate the peak magnitude $I_{PK}$ of the load current $I_{LOAD}$ to be equal to the minimum rated current $I_{MIN}$) and an inactive state (e.g., in which the control circuit 150 freezes the control loop and does not generate the drive control signals $V_{DRIVE1}$, $V_{DRIVE2}$). FIG. 4 shows a state diagram illustrating the transmission between the two states. The control circuit 150 may switch the forward converter 240 between the active state and the inactive state in dependence upon a burst duty cycle $DC_{BURST}$ and/or a burst mode period $T_{BURST}$ (e.g., as shown in FIG. 4). The control circuit 150 may adjust the burst duty cycle $DC_{BURST}$ as a function of the target intensity $L_{TRGT}$, which may be below the transition intensity $L_{TRAN}$ (e.g., as shown in FIG. 3). In the active state of the burst mode (as well as in the normal mode), the forward converter 240 may be characterized by a turn-on time $T_{TURN-ON}$ and a turn-off time $T_{TURN-OFF}$. The turn-on time $T_{TURN-ON}$ may be a time period from when the drive control signals $V_{DRIVE1}$, $V_{DRIVE2}$ are driven until the respective FET Q210, Q212 is rendered conductive. The turn-off time $T_{TURN-OFF}$ may be a time period from when the drive control signals $V_{DRIVE1}$, $V_{DRIVE2}$ are driven until the respective FET Q210, Q212 is rendered non-conductive.

The inverter voltage $V_{INV}$ may be coupled to the primary winding of a transformer 220 through a DC-blocking capacitor C216 (e.g., which may have a capacitance of approximately 0.047 μF). A primary voltage $V_{PRI}$ may be generated across the primary winding. The transformer 220 may be characterized by a turns ratio $n_{TURNS}$ (e.g., $N_1/N_2$), which may be approximately 115:29. A sense voltage $V_{SENSE}$ may be generated across a sense resistor R222, which may be coupled in series with the primary winding of the transformer 220. The FETs Q210, Q212 and the primary winding of the transformer 220 may be characterized by parasitic capacitances $C_{P1}$, $C_{P2}$, $C_{P3}$, respectively. The secondary winding of the transformer 220 may generate a secondary voltage. The secondary voltage may be coupled to the AC terminals of a full-wave diode rectifier bridge 224 for rectifying the secondary voltage generated across the secondary winding. The positive DC terminal of the rectifier bridge 224 may be coupled to the LED light source 202 through an output energy-storage inductor L226 (e.g., which may have an inductance of approximately 10 mH). The load voltage $V_{LOAD}$ may be generated across an output capacitor C228 (e.g., which may have a capacitance of approximately 3 μF).

The current sense circuit 260 may comprise an averaging circuit for producing the load current feedback signal $V_{I-LOAD}$. The averaging circuit may include a low-pass filter. The low-pass filter may comprise a capacitor C230 (e.g., which may have a capacitance of approximately 0.066 uF) and a resistor R232 (e.g., which may have a resistance of approximately 3.32 kΩ). The low-pass filter may receive the sense voltage $V_{SENSE}$ via a resistor R234 (e.g., which may have a resistance of approximately 1 kΩ). The current sense circuit 160 may comprise a transistor Q236 (e.g., a FET as shown in FIG. 5). The transistor Q236 may be coupled between the junction of the resistors R232, R234 and circuit common. The gate of the transistor Q236 may be coupled to circuit common through a resistor R238 (e.g., which may have a resistance of approximately 22 kΩ). The gate of the transistor Q236 may receive the signal-chopper control signal $V_{CHOP}$ from the control circuit 150. An example of the current sense circuit 260 may be described in greater detail in commonly-assigned U.S. patent application Ser. No. 13/834,153, filed Mar. 15, 2013, entitled FORWARD CONVERTER HAVING A PRIMARY-SIDE CURRENT SENSE CIRCUIT, the entire disclosure of which is hereby incorporated by reference.

Figure 6:
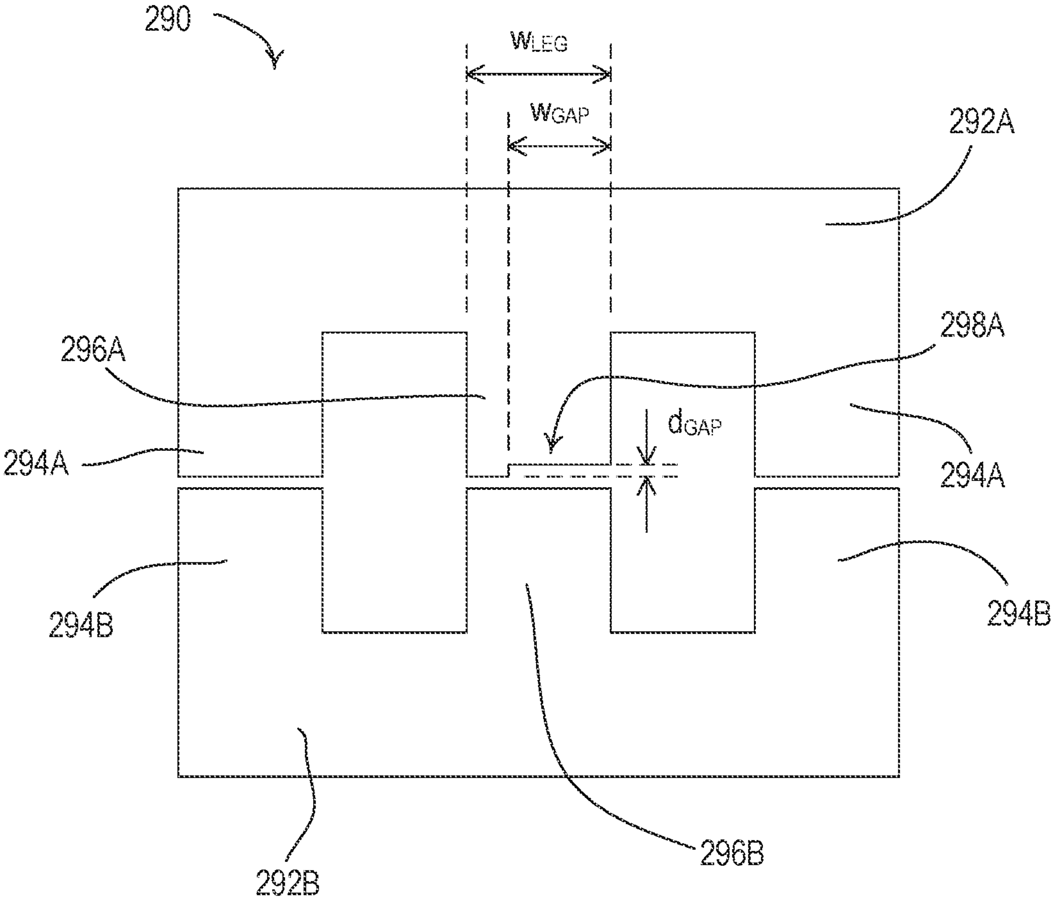
FIG. 6 is an example diagram illustrating a magnetic core set of an energy-storage inductor of a forward converter.

FIG. 6 is a diagram illustrating an example magnetic core set 290 of an energy-storage inductor (e.g., the output energy-storage inductor L226 of the forward converter 240 shown in FIG. 5). The magnetic core set 290 may comprise two E-cores 292A, 292B, and may comprise part number PC40EE16-Z, manufactured by TDK Corporation. The E-cores 292A, 292B may comprise respective outer legs 294A, 294B and inner legs 296A, 296B. The inner legs 296A, 296B may be characterized by a width $w_{LEG}$ (e.g., approximately 4 mm). The inner leg 296A of the first E-core 292A may comprise a partial gap 298A (e.g., the magnetic core set 290 may be partially-gapped), such that the inner legs 296A, 296B may be spaced apart by a gap distance $d_{GAP}$ (e.g., approximately 0.5 mm). The partial gap 298A may extend for a gap width $w_{GAP}$ (e.g., approximately 2.8 mm) such that the partial gap 298A may extend for approximately 70% of the leg width $w_{LEG}$ of the inner leg 296A. Either or both of the inner legs 296A, 296B may comprise partial gaps. The partially-gapped magnetic core set 290 (e.g., as shown in FIG. 6) may allow the output energy-storage inductor L226 of the forward converter 240 (e.g., shown in FIG. 5) to maintain continuous current at low load conditions (e.g., near the low-end intensity $L_{LE}$).

Figure 7:
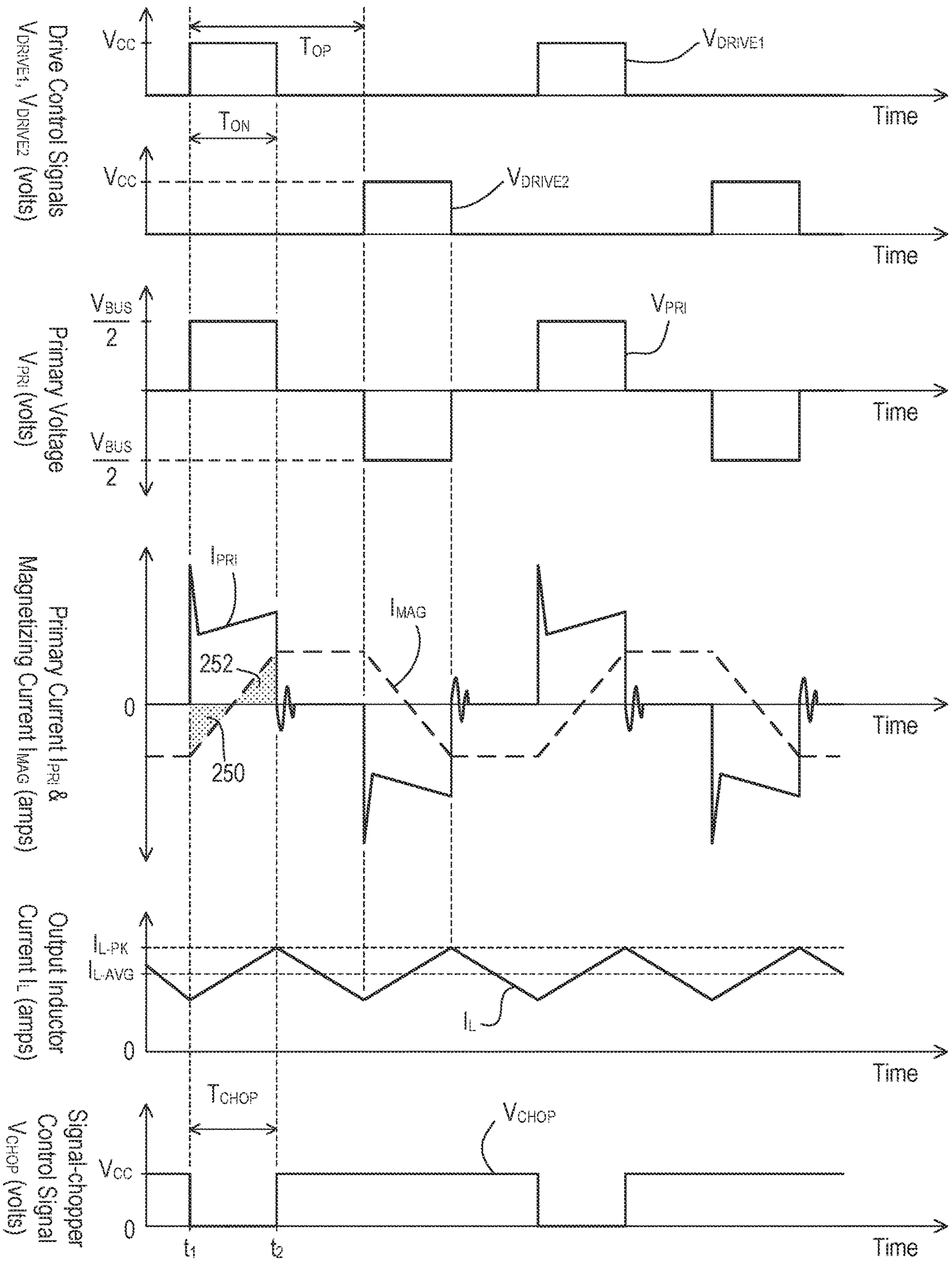
FIG. 7 shows example waveforms illustrating the operation of a forward converter and a current sense circuit when the intensity of an LED light source is near a high-end intensity.

FIG. 7 shows waveforms illustrating example operation of a forward converter (e.g., the forward converter 240) and a current sense circuit (e.g., the current sense circuit 260). The forward converter 240 may generate the waveforms shown in FIG. 7, for example, when operating in the normal mode and in the active state of the burst mode as described herein. As shown in FIG. 7, a control circuit (e.g., the control circuit 150) may drive the respective drive control signals $V_{DRIVE1}$, $V_{DRIVE2}$ high to approximately the supply voltage $V_{CC}$ to render the respective FETs Q210, Q212 conductive for an on time $T_{ON}$. The FETs Q210, Q212 may be rendered conductive at different times. When the high-side FET Q210 is conductive, the primary winding of the transformer 220 may conduct a primary current $I_{PRI}$ to circuit common, e.g., through the capacitor C216 and sense resistor R222. After (e.g., immediately after) the high-side FET Q210 is rendered conductive (at time $t_1$ in FIG. 7), the primary current $I_{PRI}$ may exhibit a short high-magnitude pulse, e.g., due to the parasitic capacitance $C_{P3}$ of the transformer 220 as shown in FIG. 7. While the high-side FET Q210 is conductive, the capacitor C216 may charge, such that a voltage having a magnitude of approximately half of the magnitude of the bus voltage $V_{BUS}$ may be developed across the capacitor. The magnitude of the primary voltage $V_{PRI}$ across the primary winding of the transformer 220 may be equal to approximately half of the magnitude of the bus voltage $V_{BUS}$ (e.g., $V_{BUS}/2$). When the low-side FET Q212 is conductive, the primary winding of the transformer 220 may conduct the primary current $I_{PRI}$ in an opposite direction and the capacitor C216 may be coupled across the primary winding, such that the primary voltage $V_{PRI}$ may have a negative polarity with a magnitude equal to approximately half of the magnitude of the bus voltage $V_{BUS}$.

When either of the high-side and low-side FETs Q210, Q212 are conductive, the magnitude of an output inductor current $I_L$ conducted by the output inductor L226 and/or the magnitude of the load voltage $V_{LOAD}$ across the LED light source 202 may increase with respect to time. The magnitude of the primary current $I_{PRI}$ may increase with respect to time while the FETs Q210, Q212 are conductive (e.g., after an initial current spike). When the FETs Q210, Q212 are non-conductive, the output inductor current $I_L$ and the load voltage $V_{LOAD}$ may decrease in magnitude with respective to time. The output inductor current $I_L$ may be characterized by a peak magnitude $I_{L-PK}$ and an average magnitude $I_{L-AVG}$, for example, as shown in FIG. 7. The control circuit 150 may increase and/or decrease the on times $T_{ON}$ of the drive control signals $V_{DRIVE1}$, $V_{DRIVE2}$ (e.g., and the duty cycle $DC_{INV}$ of the inverter voltage $V_{INV}$) to respectively increase and/or decrease the average magnitude $I_{L-AVG}$ of the output inductor current $I_L$, and thus respectively increase and/or decrease the intensity of the LED light source 202.

When the FETs Q210, Q212 are rendered non-conductive, the magnitude of the primary current $I_{PRI}$ may drop toward zero amps (e.g., as shown at time $t_2$ in FIG. 7 when the high-side FET Q210 is rendered non-conductive). A magnetizing current $I_{MAG}$ may continue to flow through the primary winding of the transformer 220, e.g., due to the magnetizing inductance $L_{MAG}$ of the transformer. When the target intensity $L_{TRGT}$ of the LED light source 102 is near the low-end intensity $L_{LE}$, the magnitude of the primary current $I_{PRI}$ may oscillate after either of the FETs Q210, Q212 is rendered non-conductive. The oscillation may be caused by the parasitic capacitances $C_{P1}$, $C_{P2}$ of the FETs, the parasitic capacitance $C_{P3}$ of the primary winding of the transformer 220, and/or other parasitic capacitances of the circuit (e.g., such as the parasitic capacitances of the printed circuit board on which the forward converter 240 is mounted).

The real component of the primary current $I_{PRI}$ may indicate the magnitude of the secondary current $I_{SEC}$ and thus the intensity of the LED light source 202. The magnetizing current $I_{MAG}$ (e.g., the reactive component of the primary current $I_{PRI}$) may flow through the sense resistor R222. When the high-side FET Q210 is conductive, the magnetizing current $I_{MAG}$ may change from a negative polarity to a positive polarity. When the low-side FET Q212 is conductive, the magnetizing current $I_{MAG}$ may change from a positive polarity to a negative polarity. When the magnitude of the primary voltage $V_{PRI}$ is zero volts, the magnetizing current $I_{MAG}$ may remain constant, for example, as shown in FIG. 7. The magnetizing current $I_{MAG}$ may have a maximum magnitude defined by the following equation:

$$I_{MAG-MAX} = \frac{V_{BUS} \cdot T_{HC}}{4 \cdot L_{MAG}},$$

where $T_{HC}$ may be the half-cycle period of the inverter voltage $V_{INV}$, e.g., $T_{HC}=T_{OP}/2$. As shown in FIG. 7, the areas 250, 252 may be approximately equal such that the average value of the magnitude of the magnetizing current $I_{MAG}$ may be zero during the period of time when the magnitude of the primary voltage $V_{PRI}$ is greater than approximately zero volts (e.g., during the on time $T_{ON}$ as shown in FIG. 7).

The current sense circuit 260 may determine an average of the primary current $I_{PRI}$ during the positive cycles of the inverter voltage $V_{INV}$, e.g., when the high-side FET Q210 is conductive. As described herein, the high-side FET Q210 may be conductive during the on time $T_{ON}$. The current sense circuit 260 may generate a load current feedback signal $V_{I-LOAD}$, which may have a DC magnitude that is the average value of the primary current $I_{PRI}$ (e.g., when the high-side FET Q210 is conductive). Because the average value of the magnitude of the magnetizing current $I_{MAG}$ may be approximately zero during the period of time that the high-side FET Q210 is conductive (e.g., during the on time $T_{ON}$), the load current feedback signal $V_{I-LOAD}$ generated by the current sense circuit may indicate the real component (e.g., only the real component) of the primary current $I_{PRI}$ (e.g., during the on time $T_{ON}$).

When the high-side FET Q210 is rendered conductive, the control circuit 150 may drive the signal-chopper control signal $V_{CHOP}$ low towards circuit common to render the transistor Q236 of the current sense circuit 260 non-conductive for a signal-chopper time $T_{CHOP}$. The signal-chopper time $T_{CHOP}$ may be approximately equal to the on time $T_{ON}$ of the high-side FET Q210, e.g., as shown in FIG. 7. The capacitor C230 may charge from the sense voltage $V_{SENSE}$ through the resistors R232, R234 while the signal-chopper control signal $V_{CHOP}$ is low. The magnitude of the load current feedback signal $V_{I-LOAD}$ may be the average value of the primary current $I_{PRI}$ and may indicate the real component of the primary current during the time when the high-side FET Q210 is conductive. When the high-side FET Q210 is not conductive, the control circuit 150 may drive the signal-chopper control signal $V_{CHOP}$ high to render the transistor Q236 conductive. Accordingly, as described herein, the control circuit 150 may be able to determine the average magnitude of the load current $I_{LOAD}$ from the magnitude of the load current feedback signal $V_{I-LOAD}$, at least partially because the effects of the magnetizing current $I_{MAG}$ and the oscillations of the primary current $I_{PRI}$ on the magnitude of the load current feedback signal $V_{I-LOAD}$ may be reduced or eliminated.

As the target intensity $L_{TRGT}$ of the LED light source 202 is decreased towards the low-end intensity $L_{LE}$ and/or as the on times $T_{ON}$ of the drive control signals $V_{DRIVE1}$, $V_{DRIVE2}$ get smaller, the parasitic of the load regulation circuit 140 (e.g., the parasitic capacitances $C_{P1}$, $C_{P2}$ of the FETs Q210, Q212, the parasitic capacitance $C_{P3}$ of the primary winding of the transformer 220, and/or other parasitic capacitances of the circuit) may cause the magnitude of the primary voltage $V_{PRI}$ to slowly decrease towards zero volts after the FETs Q210, Q212 are rendered non-conductive.

Figure 8:
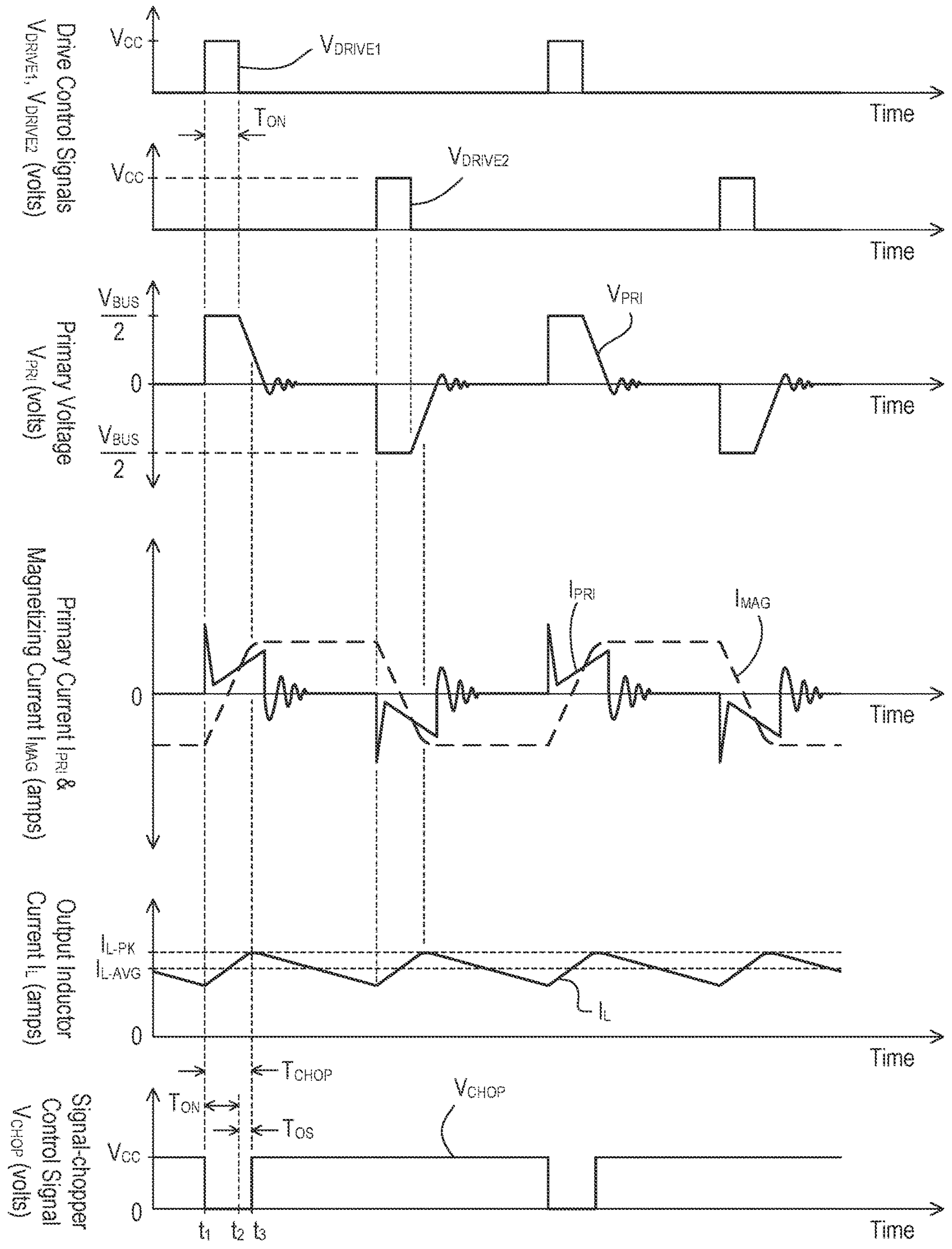
FIG. 8 shows example waveforms illustrating the operation of a forward converter and a current sense circuit when the intensity of an LED light source is near a low-end intensity.

FIG. 8 shows example waveforms illustrating the operation of a forward converter and a current sense circuit (e.g., the forward converter 240 and the current sense circuit 260) when the target intensity $L_{TRGT}$ is near the low-end intensity $L_{LE}$, and when the forward converter 240 is operating in the normal mode and the active state of the burst mode. The gradual drop off in the magnitude of the primary voltage $V_{PRI}$ may allow the primary winding of the transformer 220 to continue to conduct the primary current $I_{PRI}$, such that the transformer 220 may continue to deliver power to the secondary winding after the FETs Q210, Q212 are rendered non-conductive, e.g., as shown in FIG. 8. The magnetizing current $I_{MAG}$ may continue to increase in magnitude after the on time $T_{ON}$ of the drive control signal $V_{DRIVE1}$ (e.g., and/or the drive control signal $V_{DRIVE2}$). The control circuit 150 may increase the signal-chopper time $T_{CHOP}$ to be greater than the on time $T_{ON}$. For example, the control circuit 150 may increase the signal-chopper time $T_{CHOP}$ (e.g., during which the signal-chopper control signal $V_{CHOP}$ is low) by an offset time $T_{OS}$ when the target intensity $L_{TRGT}$ of the LED light source 202 is near the low-end intensity $L_{LE}$.

Figure 9:
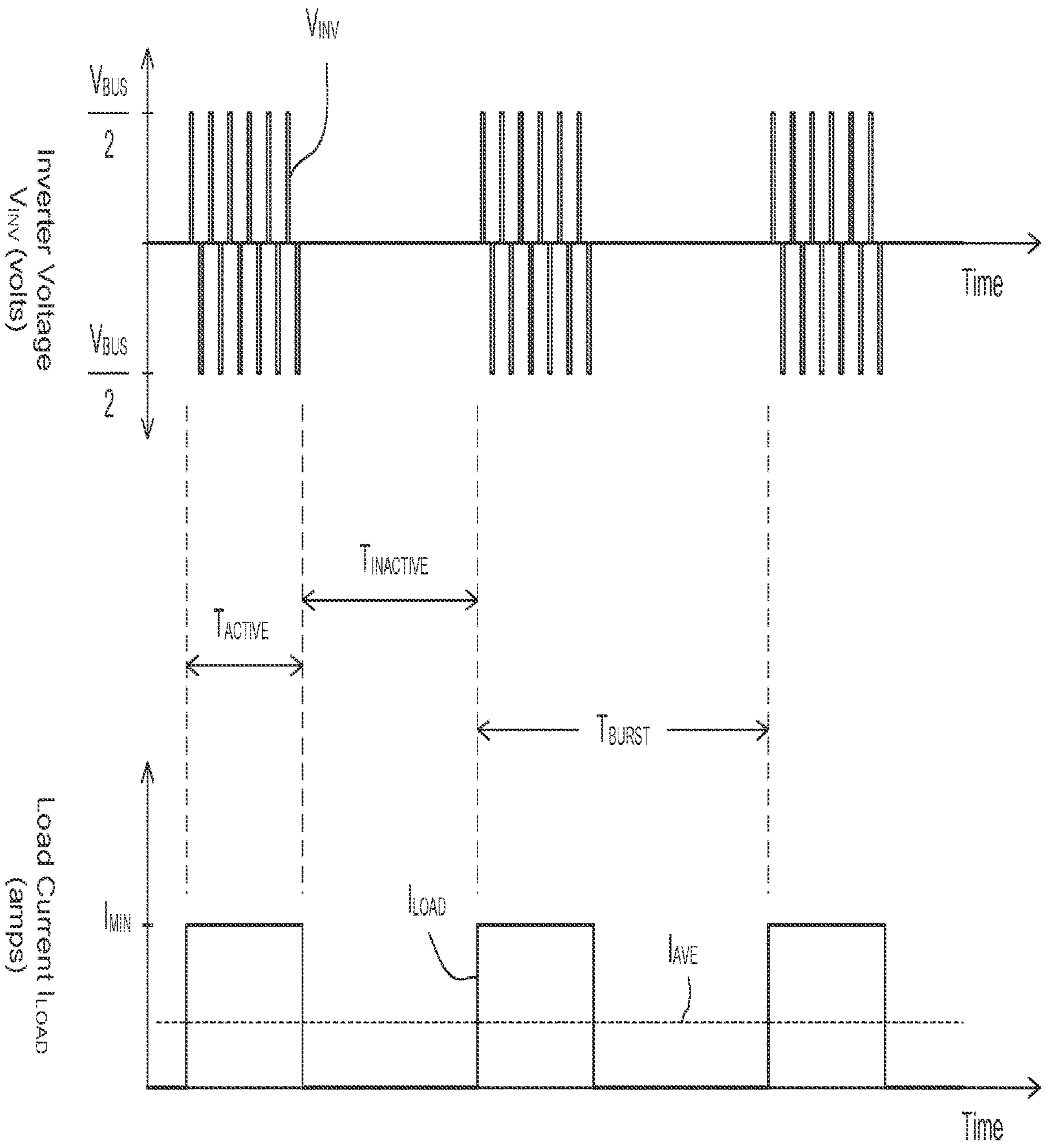
FIG. 9 shows example waveforms illustrating the operation of a forward converter of an LED driver when operating in a burst mode.

FIG. 9 shows example waveforms illustrating the operation of a forward converter (e.g., the forward converter 240 shown in FIG. 5) during the burst mode. The inverter circuit of the forward converter 240 may be controlled to generate the inverter voltage $V_{INV}$ during an active state (e.g., for an active state period $T_{ACTIVE}$). A purpose of the inverter voltage $V_{INV}$ may be to regulate the magnitude of the load current $I_{LOAD}$ to the minimum rated current $I_{MIN}$ during the active state period. During the inactive state (e.g., for an inactive state period $T_{INACTIVE}$), the inverter voltage $V_{INV}$ may be reduced to zero (e.g., not generated). The forward converter may enter the active state on a periodic basis with an interval approximately equal to a burst mode period $T_{BURST}$ (e.g., approximately 4.4 milliseconds). The active state period $T_{ACTIVE}$ and inactive state period $T_{INACTIVE}$ may be characterized by durations that are dependent upon a burst duty cycle $DC_{BURST}$, e.g., $T_{ACTIVE}=DC_{BURST}-T_{BURST}$ and $T_{INACTIVE}=(1-DC_{BURST})-T_{BURST}$. The average magnitude $I_{AVE}$ of the load current $I_{LOAD}$ may be dependent on the burst duty cycle $DC_{BURST}$. For example, the average magnitude $I_{AVE}$ of the load current $I_{LOAD}$ may be equal to the burst duty cycle $DC_{BURST}$ times the load current $I_{LOAD}$ (e.g., $I_{AVE}=DC_{BURST}\cdot I_{LOAD}$). When the load current $I_{LOAD}$ is equal to the minimum load current $I_{MIN}$, the average magnitude $I_{AVE}$ of the load current $I_{LOAD}$ may be equal to $DC_{BURST}\cdot I_{MIN}$.

The burst duty cycle $DC_{BURST}$ may be controlled (e.g., by the control circuit 150) in order to adjust the average magnitude $I_{AVE}$ of the load current $I_{LOAD}$. The burst duty cycle $DC_{BURST}$ may be controlled in different ways. For example, the burst duty cycle $DC_{BURST}$ may be controlled by holding the burst mode period $T_{BURST}$ constant and varying the length of the active state period $T_{ACTIVE}$. As another example, the burst duty cycle $DC_{BURST}$ may be controlled by holding the active state period $T_{ACTIVE}$ constant and varying the length of the inactive state period $T_{INACTIVE}$ (and thus the burst mode period $T_{BURST}$). As the burst duty cycle $DC_{BURST}$ is increased, the average magnitude $I_{AVE}$ of the load current $I_{LOAD}$ may increase. As the burst duty cycle $DC_{BURST}$ is decreased, the average magnitude $I_{AVE}$ of the load current $I_{LOAD}$ may decrease. In an example, the burst duty cycle $DC_{BURST}$ may be adjusted via open loop control (e.g., in response to the target intensity $L_{TRGT}$). In another example, the burst duty cycle $DC_{BURST}$ may be adjusted via closed loop control (e.g., in response to the load current feedback signal $V_{I-LOAD}$).

Figure 10:
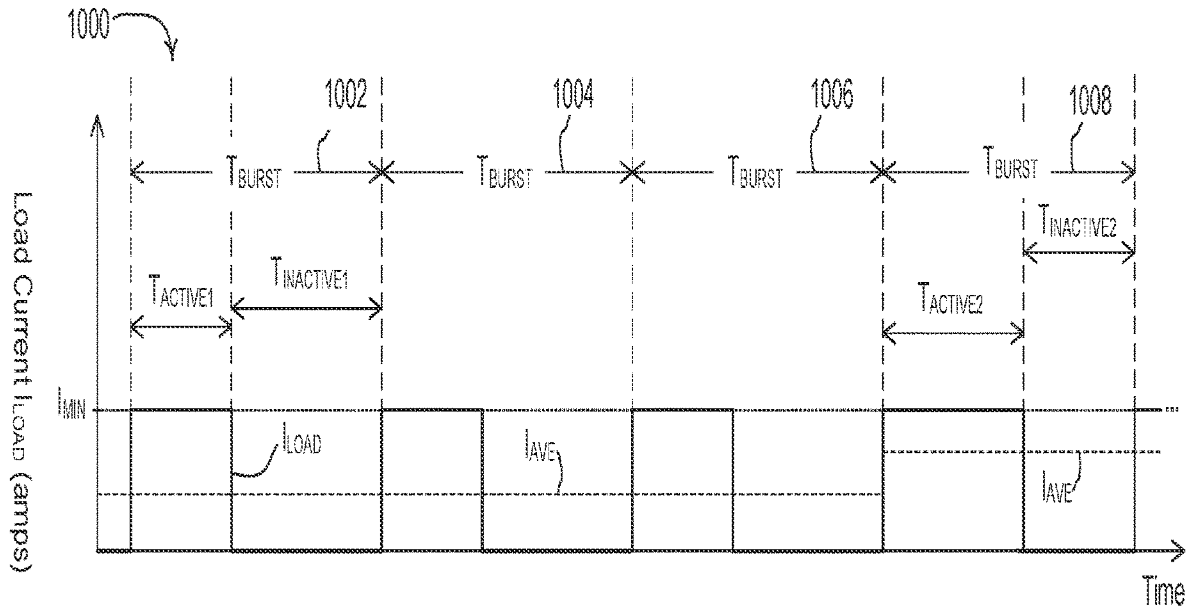
FIG. 10 shows a diagram of an example waveform illustrating a load current when a load regulation circuit is operating in a burst mode.

FIG. 10 shows a diagram of an example waveform 1000 illustrating the load current $I_{LOAD}$ when a load regulation circuit (e.g., the load regulation circuit 140) operates in the burst mode. The active state period $T_{ACTIVE}$ of the load current $I_{LOAD}$ may have a length that is dependent upon the length of an inverter cycle of the inverter circuit (e.g., the operating period $T_{OP}$). For example, referring back to FIG. 9, the active state period $T_{ACTIVE}$ may comprise six inverter cycles, and as such, has a length that is equal to the duration of the six inverter cycles. A control circuit (e.g., the control circuit 150 of the LED driver 100 shown in FIG. 1 and/or the control circuit 150 show in FIG. 5) may adjust (e.g., increase or decrease) the active state periods $T_{ACTIVE}$ by adjusting the number of inverter cycles in the active state period $T_{ACTIVE}$. As such, the control circuit may be operable to adjust the active state periods $T_{ACTIVE}$ by specific increments/decrements (e.g., the values of which may be predetermined), with each increment/decrement equal to approximately one inverter cycle (e.g., such as the low-end operating period $T_{OP-LE}$, which may be approximately 12.8 microseconds). Since the average magnitude $I_{AVE}$ of the load current $I_{LOAD}$ may depend upon the active state period $T_{ACTIVE}$, the average magnitude $I_{AVE}$ may be adjusted by an increment/decrement (e.g., the value of which may be predetermined) that corresponds to a change in load current $I_{LOAD}$ resulting from the addition or removal of one inverter cycle per active state period $T_{ACTIVE}$.

FIG. 10 shows four example burst mode periods $T_{BURST}$ 1002, 1004, 1006, 1008 with equivalent lengths. The first three burst mode periods 1002, 1004, 1006 may be characterized by equivalent active state periods $T_{ACTIVE1}$ (e.g., with a same number of inverter cycles) and equivalent inactive state periods $T_{INACTIVE1}$. The fourth burst mode periods $T_{BURST}$ 1008 may be characterized by an active state period $T_{ACTIVE2}$ that is larger than the active state period $T_{ACTIVE1}$ (e.g., by an additional inverter cycle) and an inactive state period $T_{INACTIVE2}$ that is smaller than the inactive state period $T_{INACTIVE1}$ (e.g., by one fewer inverter cycle). The larger active state period $T_{ACTIVE2}$ and smaller inactive state period $T_{INACTIVE2}$ may result in a larger duty cycle and a corresponding larger average magnitude $I_{AVE}$ of the load current $I_{LOAD}$ (e.g., as shown during burst mode period 1008). As the average magnitude $I_{AVE}$ of the load current $I_{LOAD}$ increases, the intensity of the light source may increase accordingly. Hence, as shown in FIG. 10, by adding inverter cycles to or removing inverter cycles from the active state periods $T_{ACTIVE}$ while maintaining the length of the burst mode periods $T_{BURST}$, the control circuit may be operable to adjust the average magnitude $I_{AVE}$ of the load current $I_{LOAD}$. Such adjustments to only the active state periods $T_{ACTIVE}$, however, may cause changes in the intensity of the lighting load that are perceptible to the user, e.g., when the target intensity is equal to or below the low-end intensity $L_{LE}$ (e.g., 5% of a rated peak intensity).

Figure 11:
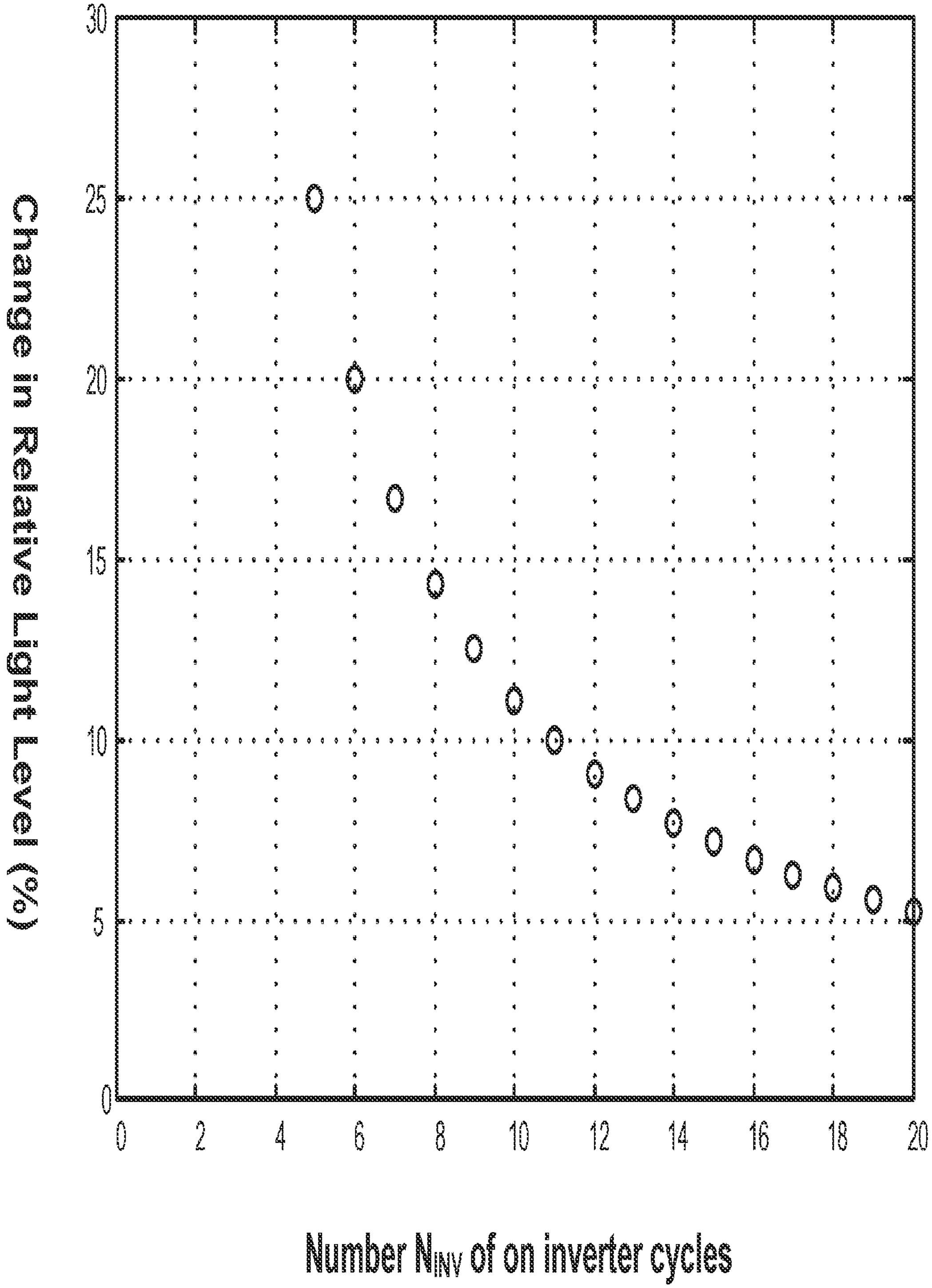
FIG. 11 shows an example plot illustrating how a relative average light level may change as a function of a number of inverter cycles included in an active state period when a load regulation circuit is operating in a burst mode.

FIG. 11 illustrates how the average light intensity of a light source may change as a function of the number $N_{INV}$ of inverter cycles included in an active state period $T_{ACTIVE}$ if the control circuit only adjusts the active state period $T_{ACTIVE}$ during the burst mode. As described herein, the active state period $T_{ACTIVE}$ may be expressed as $T_{ACTIVE}=N_{INV}\cdot T_{OP\text{-}LE}$, wherein $T_{OP\text{-}LE}$ may represent a low-end operating period of the relevant inverter circuit. As shown in FIG. 11, if the control circuit adjusts the length of the active state period $T_{ACTIVE}$ from four to five inverter cycles, the relative light level may change by approximately 25%. If the control circuit adjusts the length of the active state period $T_{ACTIVE}$ from five to six inverter cycles, the relative light level may change by approximately 20%.

Fine tuning of the intensity of a lighting load while operating in the burst mode may be achieved by configuring the control circuit to apply different control techniques to the load regulation circuit. For example, the control circuit may be configured to apply a specific control technique based on the target intensity. As described herein, the control circuit may enter the burst mode of operation if the target intensity is equal to or below the transition intensity $L_{TRAN}$ (e.g., approximately 5% of a rated peak intensity). Within this low-end intensity range (e.g., from approximately 1% to 5% of the rated peak intensity), the control circuit may be configured to operate in at least two different modes. A low-end mode may be entered when the target intensity is within the lower portion of the low-end intensity range, e.g., between approximately 1% and 4% of the rated peak intensity. An intermediate mode may be entered when the target intensity is within the higher portion of the low-end intensity range, e.g., from approximately 4% of the rated peak intensity to the transition intensity $L_{TRAN}$ or just below the transition intensity $L_{TRAN}$ (e.g., approximately 5% of the rated peak intensity).

Figure 12:
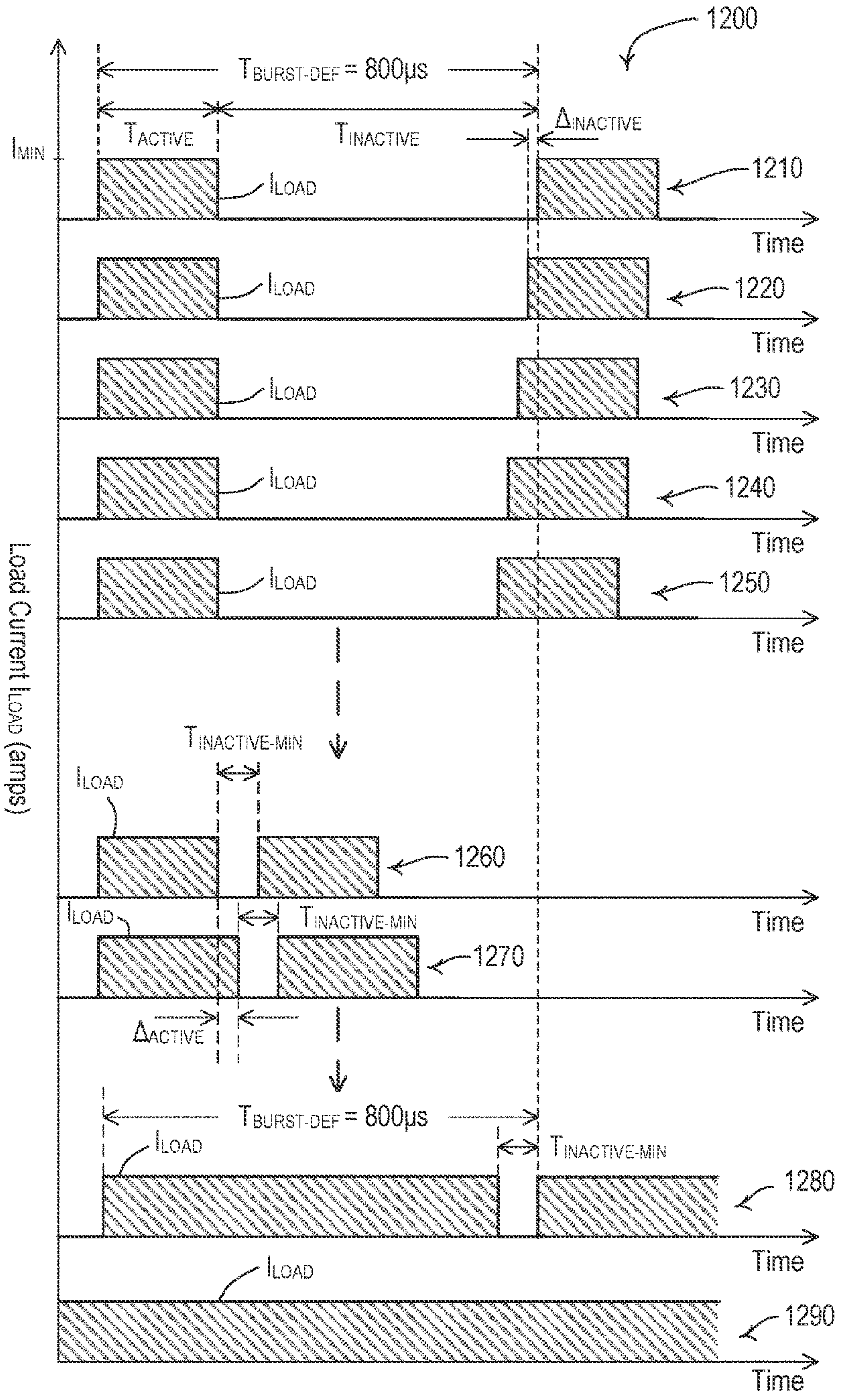
FIG. 12 shows example waveforms illustrating a load current when a control circuit of the LED driver of FIG. 1 is operating in a burst mode.

FIG. 12 shows example waveforms illustrating a load current when a control circuit (e.g., the control circuit 150) is operating in a burst mode. For example, as shown in FIG. 12, the target intensity $L_{TRGT}$ of the light source (e.g., the LED light source 202) may increase from approximately the low-end intensity $L_{LE}$ to the transition intensity $L_{TRAN}$ from one waveform to the next moving down the sheet from the top to the bottom. The control circuit may control the load current $I_{LOAD}$ over one or more default burst mode periods $T_{BURST\text{-}DEF}$. The default burst mode period $T_{BURST\text{-}DEF}$ may, for example, have a value of approximately 800 microseconds to correspond to a frequency of approximately 1.25 kHz. The inverter circuit of the load regulation circuit may be characterized by an operating frequency $f_{OP\text{-}BURST}$ (e.g., approximately 25 kHz) and an operating period $T_{OP\text{-}BURST}$ (e.g., approximately 40 microseconds).

The control circuit may enter the low-end mode of operation when the target intensity $L_{TRGT}$ of the light source is between a first value (e.g., the low-end intensity $L_{LE}$, which may be approximately 1% of the rated peak intensity) and a second value (e.g., approximately 4% of a rated peak intensity). In the low-end mode, the control circuit may be configured to adjust the average magnitude $I_{AVE}$ of the load current $I_{LOAD}$ (and thereby the intensity of the light source) by adjusting the length of the inactive state periods $T_{INACTIVE}$ while keeping the length of the active state periods $T_{ACTIVE}$ constant. For example, to increase the average magnitude $I_{AVE}$, the control circuit may keep the length of the active state periods $T_{ACTIVE}$ constant and decrease the length of the inactive state periods $T_{INACTIVE}$; to decrease the average magnitude $I_{AVE}$, the control circuit may keep the length of the active state periods $T_{ACTIVE}$ Constant and increase the length of the inactive state periods $T_{INACTIVE}$.

The control circuit may adjust the length of the inactive state period $T_{INACTIVE}$ in one or more steps. For example, the control circuit may adjust the length of the inactive state period $T_{INACTIVE}$ by an inactive-state adjustment amount $\Delta_{INACTIVE}$ at a time. The inactive-state adjustment amount $\Delta_{INACTIVE}$ may have a value (e.g., a predetermined value) that is, for example, a percentage (e.g., approximately 1%) of the default burst mode period $T_{BURST\text{-}DEF}$ or in proportion to the length of a timer tick (e.g., a tick of a timer comprised in the control device). Other values for the inactive-state adjustment amount $\Delta_{INACTIVE}$ may also be possible, so long as they may allow fine tuning of the intensity of the light source. The value of the inactive-state adjustment amount $\Delta_{INACTIVE}$ may be stored in a storage device (e.g., a memory). The storage device may be coupled to the control device and/or accessible to the control device. The value of the inactive-state adjustment amount $\Delta_{INACTIVE}$ may be set during a configuration process of the load control system. The value may be modified, for example, via a user interface.

The control circuit may adjust the length of the inactive state periods $T_{INACTIVE}$ as a function of the target intensity $L_{TRGT}$ (e.g., using open loop control). For example, given a target intensity $L_{TRGT}$, the control circuit may determine an amount of adjustment to apply to the inactive state period $T_{INACTIVE}$ in order to bring the intensity of the light source to the target intensity. The control circuit may determine the amount of adjustment in various ways, e.g., by calculating the value in real-time and/or by retrieving the value from memory (e.g., via a lookup table or the like). The control circuit may be configured to adjust the length of the inactive state periods $T_{INACTIVE}$ by the inactive-state adjustment amount $\Delta_{INACTIVE}$ one step at a time (e.g., in multiple steps) until the target intensity is achieved.

The control circuit may adjust the length of the inactive state periods $T_{INACTIVE}$ to achieve a target intensity $L_{TRGT}$ based on a current feedback signal (e.g., using closed loop control). For example, given the target intensity $L_{TRGT}$, the control circuit may be configured to adjust the length of the inactive state periods $T_{INACTIVE}$ initially by the inactive-state adjustment amount $\Delta_{INACTIVE}$. The control circuit may then wait for a load current feedback signal $V_{I-LOAD}$ from a current sense circuit (e.g., the current sense circuit 160). The load current feedback signal $V_{I-LOAD}$ may indicate the average magnitude $I_{AVE}$ of the load current $I_{LOAD}$ and thereby the intensity of the light source. The control circuit may compare the indicated intensity of the light source with the target intensity to determine whether additional adjustments of the inactive state periods $T_{INACTIVE}$ are necessary. The control circuit may make multiple stepped adjustments to achieve the target intensity. The step size may be equal to approximately the inactive-state adjustment amount $\Delta_{INACTIVE}$.

Waveforms 1210-1260 in FIG. 12 illustrate the example control technique that may be applied in the low-end mode (e.g., as target intensity $L_{TRGT}$ is increasing from waveform 1210 to waveform 1260). As shown in the waveform 1210, the load current $I_{LOAD}$ may have a burst mode period $T_{BURST-DEF}$ (e.g., approximately 800 microseconds corresponding to a frequency of approximately 1.25 kHz) and a burst duty cycle. The burst duty cycle may be 20%, for example, to correspond to a light intensity of 1% of the rated peak intensity. The inactive state periods $T_{INACTIVE}$ corresponding to the burst mode period $T_{BURST-DEF}$ and the burst duty cycle may be denoted herein as $T_{INACTIVE-MAX}$. In the waveform 1220, the length of the inactive state periods $T_{INACTIVE}$ of the load current $I_{LOAD}$ is decreased by the inactive-state adjustment amount $\Delta_{INACTIVE}$ while the length of the active state periods $T_{ACTIVE}$ is maintained in order to adjust the intensity of the light source toward a higher target intensity. The decrease may continue in steps, e.g., as shown in the waveforms 1230 to 1260, by the inactive-state adjustment amount $\Delta_{INACTIVE}$ in each step until the target intensity is achieved or a minimum inactive state period $T_{INACTIVE-MIN}$ is reached (e.g., as shown in waveform 1260). The minimum inactive state period $T_{INACTIVE-MIN}$ may be determined based on the configuration and/or limitations of one or more hardware components of the relevant circuitry. For example, as the inactive state periods $T_{INACTIVE}$ decrease, the operating frequency of the burst mode may increase. When the operating frequency reaches a certain level, the outputs of some hardware components (e.g., the output current of the inductor L226 of the forward converter 240, as shown in FIG. 5) at the tail of one burst cycle may begin to interfere with the outputs at the start of the next burst cycle. Accordingly, in the example described herein, the minimum inactive state period $T_{INACTIVE-MIN}$ may be set to a minimum value at which the component outputs during consecutive burst cycles would not interfere with each other. In at least some cases, such a minimum value may correspond to a burst duty cycle of approximately 80% and to a target intensity value at which the control circuit may enter the intermediate mode of operation.

Once the length of the inactive state periods $T_{INACTIVE}$ has reached the minimum inactive state period $T_{INACTIVE-MIN}$, the control circuit may be configured to transition into the intermediate mode of operation described herein. In certain embodiments, the transition may occur when the target intensity is at a specific value (e.g., approximately 4% of the rated peak intensity). While in the intermediate mode, the control circuit may be configured to adjust the average magnitude $I_{AVE}$ of the load current $I_{LOAD}$ by adjusting the length of the active state period $T_{ACTIVE}$ and keeping the length of the inactive state periods $T_{INACTIVE}$ constant (e.g., at the minimum inactive state period $T_{INACTIVE-MIN}$). The adjustments to the active state periods may be made gradually, e.g., by an active-state adjustment amount $\Delta_{ACTIVE}$ in each increment/decrement (e.g., as shown in waveform 1270 in FIG. 12). In certain embodiments, the active-state adjustment amount $\Delta_{ACTIVE}$ may be approximately equal to one inverter cycle length.

The control circuit may adjust the length of the active state periods $T_{ACTIVE}$ as a function of the target intensity $L_{TRGT}$ (e.g., using open loop control). For example, given a target intensity $L_{TRGT}$, the control circuit may determine an amount of adjustment to apply to the active state period $T_{INACTIVE}$ in order to bring the intensity of the light source to the target intensity. The control circuit may determine the amount of adjustment in various ways, e.g., by calculating the value in real-time and/or by retrieving the value from memory (e.g., via a lookup table or the like). The control circuit may be configured to adjust the length of the active state periods $T_{ACTIVE}$ by the active-state adjustment amount $\Delta_{ACTIVE}$ one step at a time (e.g., in multiple steps) until the total amount of adjustment is achieved.

The control circuit may adjust the length of the active state periods $T_{ACTIVE}$ to achieve a target intensity $L_{TRGT}$ based on a current feedback signal (e.g., using closed loop control). For example, given the target intensity $L_{TRGT}$, the control circuit may be configured to adjust the length of the active state periods $T_{ACTIVE}$ initially by the active-state adjustment amount $\Delta_{ACTIVE}$. The control circuit may then wait for a load current feedback signal $V_{I-LOAD}$ from a current sense circuit (e.g., the current sense circuit 160). The load current feedback signal $V_{I-LOAD}$ may indicate the average magnitude $I_{AVE}$ of the load current $I_{LOAD}$ and thereby the intensity of the light source. The control circuit may compare the indicated intensity of the light source with the target intensity to determine whether additional adjustments of the active state periods $T_{ACTIVE}$ are necessary. The control circuit may make multiple adjustments to achieve the target intensity. For example, the adjustments may be made in multiple steps, with a step size equal to approximately the active-state adjustment amount $\Delta_{ACTIVE}$.

As the target intensity increases in the intermediate mode of operation, the control circuit may eventually adjust the burst mode period back to the initial burst mode period $T_{BURST-DEF}$ (e.g., as shown in waveform 1280 in FIG. 12). At that point, the burst duty cycle in certain embodiments may be approximately 95% and the length of the active state periods (denoted herein as $T_{ACTIVE-95\%\ DC}$) in those embodiments may be equal to approximately the difference between the initial burst mode period $T_{BURST-DEF}$ and the present length of the inactive state period $T_{INACTIVE}$ (e.g., the minimum inactive state period $T_{INACTIVE-MIN}$). To further increase the intensity of the light source until the control circuit enters the normal mode of operation (e.g., at approximately 5% of the rated peak intensity and/or 100% burst duty cycle, as shown in waveform 1290), the control circuit may be configured to apply other control techniques including, for example, a dithering technique. Since the transition is over a relatively small range (e.g., from a 95% duty cycle at the end of the intermediate mode to a 100% duty cycle at the beginning of the normal mode), it may be made with minimally visible changes in the intensity of the lighting load.

Figure 13:
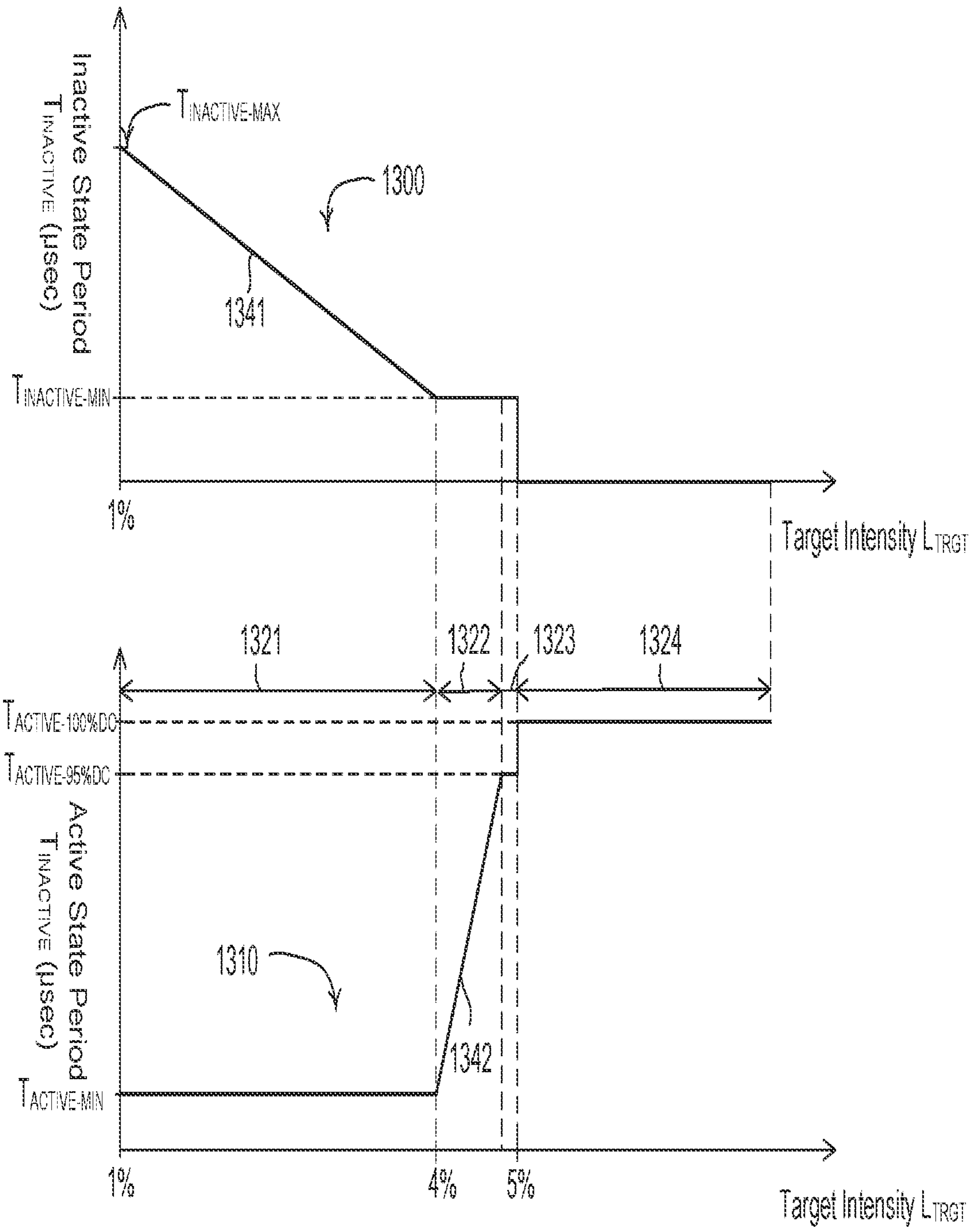
FIG. 13 shows an example of a plot relationship between a target load current and the lengths of an active state period and an inactive state period when a load regulation circuit is operating in a burst mode.

FIG. 13 shows two example plot relationships between a target intensity of the lighting load and the respective lengths of the active and inactive state periods. Both plots depict situations that may occur during one or more of the modes of operation described herein. For example, the plot 1300 shows an example plot relationship between the length of the inactive state periods $T_{INACTIVE}$ and the target intensity $L_{TRGT}$ of the light source. As another example, the plot 1310 shows an example plot relationship between the length of the active state periods $T_{ACTIVE}$ and the target intensity $L_{TRGT}$ of the light source. In the illustrated example, the length of the active state periods $T_{ACTIVE}$ may be expressed either in terms of time or in terms of the number of inverter cycles $N_{INV}$ included in the active state period $T_{ACTIVE}$.

As described herein, the control circuit (e.g., the control circuit 150) may determine the magnitude of the target load current $I_{TRGT}$ and/or the burst duty cycle $DC_{BURST}$ during the burst mode based on a target intensity $L_{TRGT}$. The control circuit may receive the target intensity $L_{TRGT}$, for example, via a digital message transmitted through a communication circuit (e.g., the communication circuit 180), via a phase-control signal from a dimmer switch, and/or the like. The control circuit may determine the length of the active state periods $T_{ACTIVE}$ and the length of the inactive state periods $T_{INACTIVE}$ such that the intensity of the light source may be driven to the target intensity $L_{TRGT}$. The control circuit may determine the lengths of the active state periods $T_{ACTIVE}$ and the inactive state periods $T_{INACTIVE}$, for example, by calculating the values in real-time or by retrieving the values from memory (e.g., via a lookup table or the like).

Referring to FIG. 13, if the control circuit determines that the target intensity $L_{TRGT}$ falls within a range 1321, the control circuit may operate in the low-end mode and may set the active state period $T_{ACTIVE}$ to a minimum active state period $T_{ACTIVE-MIN}$ (e.g., including four inverter cycles and/or corresponding to a 20% burst duty cycle). Near the low-end intensity $L_{LE}$ (e.g., approximately 1%), the control circuit may set the burst mode period to a default burst mode period (e.g., such as the default burst mode period $T_{BURST-DEF}$, which may be approximately 800 microseconds). The control circuit may set the inactive state period $T_{INACTIVE}$ according to a profile 1341, which may range from a maximum inactive state period $T_{INACTIVE-MAX}$ to a minimum inactive state period $T_{INACTIVE-MIN}$. The maximum inactive state period $T_{INACTIVE-MAX}$ may be equal to the difference between the default burst mode period and the minimum active state period $T_{ACTIVE-MIN}$, and/or may correspond to a low-end duty cycle of 20%. The minimum inactive state period $T_{INACTIVE-MIN}$ may depend on hardware configuration and/or limitations of the relevant circuitry, as described herein. The gradient (e.g., rate of change) of the profile 1341 may be determined based on an inactive-state adjustment amount (e.g., such as the inactive-state adjustment amount $\Delta_{INACTIVE}$), which may in turn be determined as a function of (e.g., in proportion to) the length of a timer tick (e.g., a timer comprised in the control device) or a percentage (e.g., approximately 1%) of the default burst mode period $T_{BURST-DEF}$, for example. As noted, the control circuit may determine the lengths of the active state period $T_{ACTIVE}$ and/or the inactive state period $T_{INACTIVE}$ by calculating the values in real-time and/or retrieving the values from memory.

If the control circuit determines that the target intensity $L_{TRGT}$ falls within a range 1322, the control circuit may operate in the intermediate mode and may set the inactive state period $T_{INACTIVE}$ to the minimum inactive state period (e.g., such as the minimum inactive state period $T_{INACTIVE-MIN}$). The control circuit may set the active state period $T_{ACTIVE}$ according to a profile 1342. The profile 1342 may have a minimum value, which may be the minimum active state period $T_{ACTIVE-MIN}$. The profile 1342 may have a maximum value $T_{ACTIVE-95\%\ DC}$, which may correspond to the active state period $T_{ACTIVE}$ when the burst mode period has been adjusted back to the default burst mode period $T_{BURST-DEF}$ and the inactive state period $T_{INACTIVE}$ is at the minimum inactive state period $T_{INACTIVE-MIN}$. In at least some examples, the maximum value for the active state period $T_{ACTIVE}$ may correspond to a burst duty cycle of 95%. The gradient (e.g., the rate of change) of the profile 1342 may be determined based on an active-state adjustment amount $\Delta_{ACTIVE}$. As described herein, the active-state adjustment amount $\Delta_{ACTIVE}$ may be equal to the length of one inverter cycle.

If the control circuit determines that the target intensity $L_{TRGT}$ falls within the range 1323, the control circuit may utilize other control techniques (e.g., such as dithering) to transition the load regulation circuit into a normal mode of operation. Although the active state period $T_{ACTIVE}$ and inactive state period $T_{INACTIVE}$ are depicted in FIG. 13 as being unchanged during the transition (e.g., from a 95% duty cycle to a 100% duty cycle), a person skilled in the art will appreciate that the profiles of the active and inactive periods may be different than depicted in FIG. 13 depending on the specific control technique applied. The normal mode of operation may occur during the range 1324 (e.g., from approximately 5% to 100% of the rated peak intensity). During the normal mode of operation, the length of the inactive state period may be reduced to near zero and the burst duty cycle may be increased to approximately 100%.

The profiles 1341, 1342 may be linear or non-linear, and may be continuous (e.g., as shown in FIG. 13) or comprise discrete steps. The inactive-state adjustment amount $\Delta_{INACTIVE}$ and/or the active-state adjustment amount $\Delta_{ACTIVE}$ may be sized to reduce visible changes in the relative light level of the lighting load. The transition points (e.g., in terms of a target intensity) at which the control circuit may switch from one mode of operation to another are illustrative and may vary in implementations, for example, based on the hardware used and/or the standard being followed.

Figure 14:
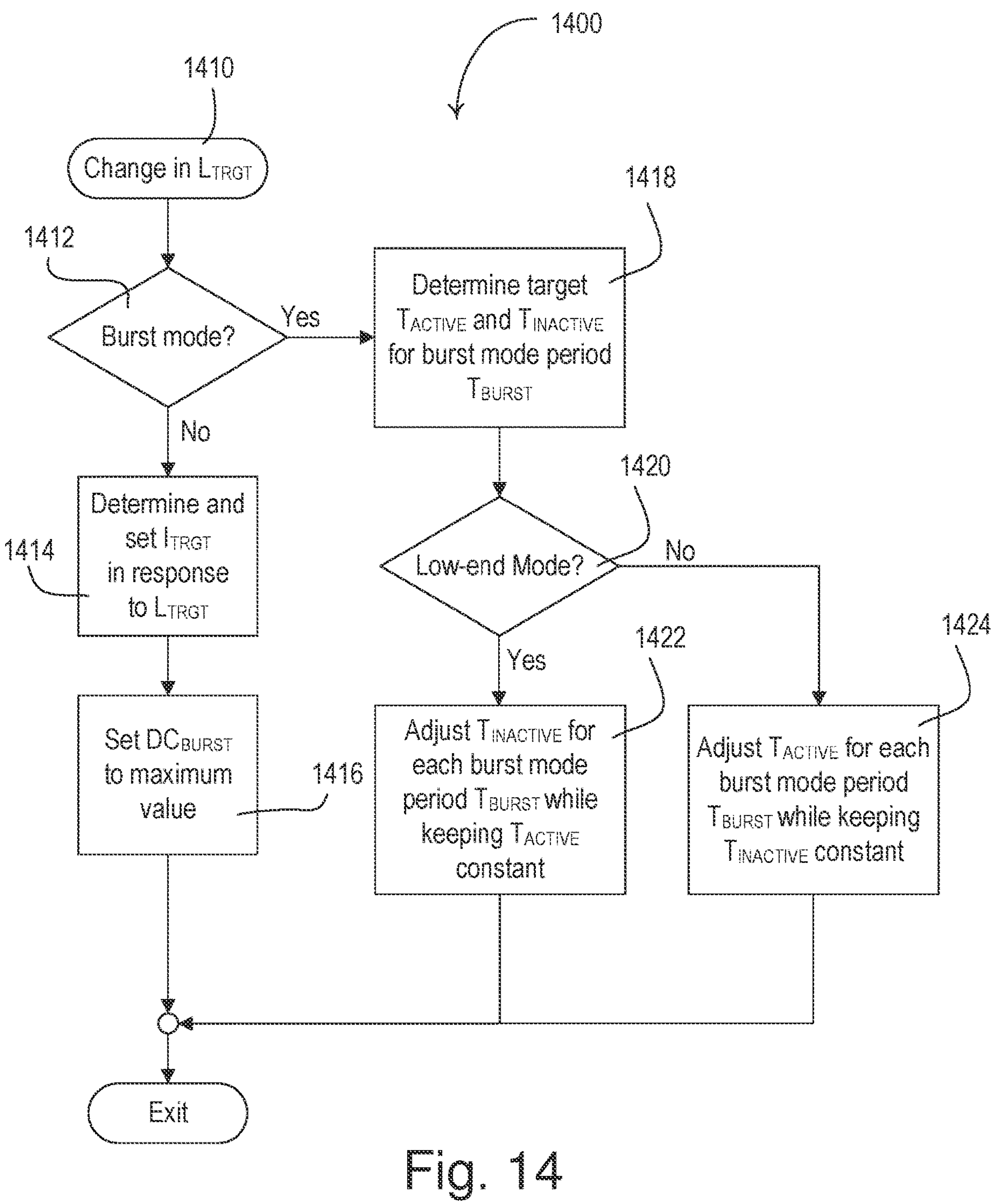
FIG. 14 shows a simplified flowchart of an example procedure for operating a LED drive circuit of an LED driver in a normal mode and a burst mode.

FIG. 14 shows a simplified flowchart of an example light intensity control procedure 1400 that may be executed by a control circuit (e.g., the control circuit 150). The light intensity control procedure 1400 may be started, for example, when a target intensity $L_{TRGT}$ of the lighting load is changed at 1410 (e.g., via digital messages received through the communication circuit 180). At 1412, the control circuit may determine whether it should operate in the burst mode (e.g., the target intensity $L_{TRGT}$ is between the low-end intensity $L_{LE}$ and the transition intensity $L_{TRAN}$, i.e., $L_{LE} \leq L_{TRGT} \leq L_{TRAN}$). If the control circuit determines that it should not be in the burst mode (e.g., but rather in the normal mode), the control circuit may, at 1414, determine and set the target load current $I_{TRGT}$ as a function of the target intensity $L_{TRGT}$ (e.g., as shown in FIG. 2). At 1416, the control circuit may set the burst duty cycle $DC_{BURST}$ equal to a maximum duty cycle $DC_{MAX}$ (e.g., approximately 100%) (e.g., as shown in FIG. 3), and the control circuit may exit the light intensity control procedure 1400.

If, at 1412, the control circuit determines that it should enter the burst mode (e.g., the target intensity $L_{TRGT}$ is below the transition intensity $L_{TRAN}$ or $L_{TRGT} < L_{TRAN}$), the control circuit may determine, at 1418, target lengths of the active state periods $T_{ACTIVE}$ and/or the inactive state periods $T_{INACTIVE}$ for one or more burst mode periods $T_{BURST}$. The control circuit may determine the target lengths of the active state periods $T_{ACTIVE}$ and/or the inactive state periods $T_{INACTIVE}$, for example, by calculating the values in real-time and/or retrieving the values from memory (e.g., via a lookup table or the like). At 1420, the control circuit may determine whether it should operate in the low-end mode of operation. If the determination is to operate in the low-end mode, the control circuit may, at 1422, adjust the length of the inactive state periods $T_{INACTIVE}$ for each of the plurality of burst mode periods $T_{BURST}$ while keeping the length of the active state periods constant. The control circuit may make multiple adjustments (e.g., with equal amount of adjustment each time) to the inactive state periods $T_{INACTIVE}$ until the target length of the inactive state periods $T_{INACTIVE}$ is reached. The control circuit may then exit the light intensity control procedure 1400.

If the determination at 1420 is to not operate in the low-end mode (but rather in the intermediate mode), the control circuit may, at 1424, adjust the length of the active state periods $T_{ACTIVE}$ for each of the plurality of burst mode periods $T_{BURST}$ while keeping the length of the inactive state periods constant. The control circuit may make multiple adjustments (e.g., with equal amount of adjustment each time) to the active state periods $T_{ACTIVE}$ until the target length of the active state periods $T_{ACTIVE}$ is reached. The control circuit may then exit the light intensity control procedure 1400.

As described herein, the control circuit may adjust the active state periods $T_{ACTIVE}$ and/or the inactive state periods $T_{INACTIVE}$ as a function of the target intensity $L_{TRGT}$ (e.g., using open loop control). The control circuit may adjust the active state periods $T_{ACTIVE}$ and/or the inactive state periods $T_{INACTIVE}$ in response to a load current feedback signal $V_{I\text{-}LOAD}$ (e.g., using closed loop control).

As described herein, during the active state periods of the burst mode, the control circuit may be configured to adjust the on time $T_{ON}$ of the drive control signals $V_{DRIVE1}$, $V_{DRIVE2}$ to control the peak magnitude $I_{PK}$ of the load current $I_{LOAD}$ to the minimum rated current $I_{MIN}$ using closed loop control (e.g., in response to the load current feedback signal $V_{I\text{-}LOAD}$). The value of the low-end operating frequency $f_{OP}$ may be selected to ensure that the control circuit does not adjust the on time $T_{ON}$ of the drive control signals $V_{DRIVE1}$, $V_{DRIVE2}$ below the minimum on time $T_{ON\text{-}MIN}$. For example, the low-end operating frequency $f_{OP}$ may be calculated by assuming worst case operating conditions and component tolerances and stored in memory in the LED driver. Since the LED driver may be configured to drive a plurality of different LED light sources (e.g., manufactured by a plurality of different manufacturers) and/or adjust the magnitude of the load current $I_{LOAD}$ and the magnitude of the load voltage $V_{LOAD}$ to a plurality of different magnitudes, the value of the on time $T_{ON}$ during the active state of the burst mode may be much greater than the minimum on time $T_{ON\text{-}MIN}$ for many installations. If the value of the on time $T_{ON}$ during the active state of the burst mode is too large, steps in the intensity of the LED light source may be visible to a user when the target intensity $L_{TRGT}$ is adjusted near the low-end intensity (e.g., during the burst mode).

One or more of the embodiments described herein (e.g., as performed by a load control device) may be used to decrease the intensity of a lighting load and/or increase the intensity of the lighting load. For example, one or more embodiments described herein may be used to adjust the intensity of the lighting load from on to off, off to on, from a higher intensity to a lower intensity, and/or from a lower intensity to a higher intensity. For example, one or more of the embodiments described herein (e.g., as performed by a load control device) may be used to fade the intensity of a light source from on to off (i.e., the low-end intensity $L_{LE}$ may be equal to 0%) and/or to fade the intensity of the light source from off to on.

Although described with reference to an LED driver, one or more embodiments described herein may be used with other load control devices. For example, one or more of the embodiments described herein may be performed by a variety of load control devices that are configured to control of a variety of electrical load types, such as, for example, a LED driver for driving an LED light source (e.g., an LED light engine); a screw-in luminaire including a dimmer circuit and an incandescent or halogen lamp; a screw-in luminaire including a ballast and a compact fluorescent lamp; a screw-in luminaire including an LED driver and an LED light source; a dimming circuit for controlling the intensity of an incandescent lamp, a halogen lamp, an electronic low-voltage lighting load, a magnetic low-voltage lighting load, or another type of lighting load; an electronic switch, controllable circuit breaker, or other switching device for turning electrical loads or appliances on and off; a plug-in load control device, controllable electrical receptacle, or controllable power strip for controlling one or more plug-in electrical loads (e.g., coffee pots, space heaters, other home appliances, and the like); a motor control unit for controlling a motor load (e.g., a ceiling fan or an exhaust fan); a drive unit for controlling a motorized window treatment or a projection screen; motorized interior or exterior shutters; a thermostat for a heating and/or cooling system; a temperature control device for controlling a heating, ventilation, and air conditioning (HVAC) system; an air conditioner; a compressor; an electric baseboard heater controller; a controllable damper; a humidity control unit; a dehumidifier; a water heater; a pool pump; a refrigerator; a freezer; a television or computer monitor; a power supply; an audio system or amplifier; a generator; an electric charger, such as an electric vehicle charger; and an alternative energy controller (e.g., a solar, wind, or thermal energy controller). A single control circuit may be coupled to and/or adapted to control multiple types of electrical loads in a load control system.

What is claimed is:

1. A lighting control apparatus comprising:

load regulation circuitry that includes inverter circuitry; and control circuitry operatively coupled to the load regulation circuit, the control circuitry to, responsive to receipt of an input that includes data representative of a target intensity:

determine whether the received target intensity is greater than a defined threshold intensity value; and responsive to the determination that the target intensity is greater than the defined threshold intensity value, cause the load regulation circuitry to operate in a first operating mode in which the duty cycle of the load regulation circuit is held constant and target current is varied to achieve a defined load current that corresponds to the target intensity; and responsive to the determining that the target intensity is not greater than the defined threshold intensity value, cause the load regulation circuitry to operate in a second operating mode in which the target current is held constant and a duty cycle of the inverter circuitry is varied to achieve the load current that corresponds to the target intensity.

2. The lighting control apparatus of claim 1 wherein to determine whether the received target intensity is greater than the defined threshold intensity value, the control circuitry to further:

determine whether the received target intensity is greater than an intensity value corresponding to a minimum load current of an operatively coupled lighting load.

3. The lighting control apparatus of claim 1 wherein to cause the load regulation circuitry to operate in the second operating mode, the control circuitry to further:

determine whether the received data representative of the target intensity is in a first intensity range that is less than the defined threshold intensity value; and responsive to receipt of the data representative of the target intensity in the first intensity range, cause the inverter circuitry to operate in a first burst mode having an active state period in which the inverter circuitry is active and an inactive state period in which the inverter circuitry is inactive;

wherein in the first burst mode, the control circuitry holds the active state period constant and varies the inactive state period to provide the load current that corresponds to the target intensity.

4. The lighting control apparatus of claim 3 wherein to cause the load regulation circuitry to operate in the second operating mode, the control circuitry to further:

determine whether the received data representative of the target intensity is in a second intensity range that between the first intensity range and the defined threshold intensity value; and cause the inverter circuitry to operate in a second burst mode responsive to the determination that the received target intensity is in the second intensity range;

wherein in the second burst mode, the control circuitry holds the inactive state period constant and varies the active state period to provide the load current that corresponds to the target intensity.

5. The lighting control apparatus of claim 1 wherein to determine whether the received target intensity is greater than the defined threshold intensity value that corresponds to a minimum load current of an operatively coupled lighting load, the control circuitry to further:

retrieve from operatively coupled memory circuitry, data representative of a low-end intensity of the operatively coupled lighting load that corresponds to a low-end trim value; and compare the received target intensity to the retrieved low-end intensity to determine whether the received target intensity is greater than the defined threshold intensity value.

6. A lighting control method, comprising:

receiving, by lighting control circuitry, an input that includes data representative of a target intensity of an operatively coupled lighting load;

determining, by the lighting control circuitry, whether the received target intensity is greater than a defined threshold intensity value; and causing, by the lighting control circuitry responsive to the determination that the received target intensity is greater than the defined threshold intensity value, operatively coupled load regulation circuitry to operate in a first operating mode in which the duty cycle of the load regulation circuitry is held constant and target current is varied to achieve a defined load current that corresponds to the received target intensity; and causing, by the lighting control circuitry responsive to the determination that the target intensity is not greater than the defined threshold intensity value, the load regulation circuitry to operate in a second operating mode in which the target current is held constant and a duty cycle of inverter circuitry included in the load regulation circuitry is varied to achieve the load current that corresponds to the target intensity.

7. The method of claim 6 wherein determining whether the received target intensity is greater than the defined threshold intensity value further comprises:

determining, by the lighting control circuitry, whether the received target intensity is greater than an intensity value corresponding to a minimum load current of an operatively coupled lighting load.

8. The method of claim 6 wherein causing the load regulation circuitry to operate in the second operating mode further comprises:

determining, by the lighting control circuitry, whether the received data representative of the target intensity is in a first intensity range that is less than the defined threshold intensity value; and causing, by the lighting control circuitry, the inverter circuitry to operate in a first burst mode having an active state period in which the inverter circuitry is active and an inactive state period in which the inverter circuitry is inactive responsive to receipt of the data representative of the target intensity in the first intensity range;

wherein in the first burst mode, the control circuitry holds the active state period constant and varies the inactive state period to provide the load current that corresponds to the target intensity.

9. The method of claim 8 wherein causing the load regulation circuitry to operate in the second operating mode further comprises:

determining, by the lighting control circuitry, whether the received data representative of the target intensity is in a second intensity range that between the first intensity range and the defined threshold intensity value; and causing, by the lighting control circuitry, the inverter circuitry to operate in a second burst mode responsive to the determination that the received target intensity is in the second intensity range;

wherein in the second burst mode, the control circuitry holds the inactive state period constant and varies the active state period to provide the load current that corresponds to the target intensity.

10. The method of claim 6 wherein determining whether the received target intensity is greater than the defined threshold intensity value that corresponds to a minimum load current of an operatively coupled lighting load further comprises:

retrieving, by the lighting control circuitry, from operatively coupled memory circuitry, data representative of a low-end intensity of the operatively coupled lighting load that corresponds to a low-end trim value; and comparing, by the lighting control circuitry, the received target intensity to the retrieved low-end intensity to determine whether the received target intensity is greater than the defined threshold intensity value.

11. A non-transitory, machine-readable, storage device that includes instructions that, when executed by lighting control circuitry operatively coupled to load regulation circuitry, cause the lighting control circuitry to:

receive an input that includes data representative of a target intensity of an operatively coupled lighting load;

determine whether the received target intensity is greater than a defined threshold intensity value that corresponds to a minimum load current of an operatively coupled lighting load; and cause the load regulation circuitry to operate in a first operating mode in which the duty cycle of the load regulation circuitry is held constant and target current is varied to achieve a defined load current that corresponds to the received target intensity responsive to the determination by the lighting control circuitry that the received target intensity is greater than the defined threshold intensity value; and cause the load regulation circuitry to operate in a second operating mode in which the target current is held constant and a duty cycle of inverter circuitry included in the load regulation circuitry is varied to achieve the load current that corresponds to the target intensity responsive to the determination that the target intensity is not greater than the defined threshold intensity value.

12. The non-transitory, machine-readable, storage device of claim 11 wherein the instructions that cause the lighting control circuitry to determine whether the received target intensity is greater than the defined threshold intensity value further cause the lighting control circuitry to:

determine whether the received target intensity is greater than the defined threshold intensity value, wherein the defined threshold intensity value corresponds to a minimum load current of the lighting load.

13. The non-transitory, machine-readable, storage device of claim 11 wherein the instructions that cause the lighting control circuitry to cause the load regulation circuitry to operate in the second operating mode further cause the lighting control circuitry to:

determine whether the received data representative of the target intensity is in a first intensity range that is less than the defined threshold intensity value; and cause inverter circuitry included in the load regulation circuitry to operate in a first burst mode having an active state period in which the inverter circuitry is active and an inactive state period in which the inverter circuitry is inactive responsive to receipt of the data representative of the target intensity in the first intensity range;

wherein in the first burst mode, the control circuitry holds the active state period constant and varies the inactive state period to provide the load current that corresponds to the target intensity.

14. The non-transitory, machine-readable, storage device of claim 13 wherein the instructions that cause the lighting control circuitry to cause the load regulation circuitry to operate in the second operating mode further cause the lighting control circuitry to:

determine whether the received data representative of the target intensity is in a second intensity range that between the first intensity range and the defined threshold intensity value; and causing, by the lighting control circuitry, the inverter circuitry to operate in a second burst mode responsive to the determination that the received target intensity is in the second intensity range;

wherein in the second burst mode, the control circuitry holds the inactive state period constant and varies the active state period to provide the load current that corresponds to the target intensity.

15. The non-transitory, machine-readable, storage device of claim 11 wherein the instructions that cause the lighting control circuitry to determine whether the received target intensity is greater than the defined threshold intensity value that corresponds to a minimum load current of an operatively coupled lighting load further cause the lighting control circuitry to:

retrieve from operatively coupled memory circuitry, data representative of a low-end intensity of the operatively coupled lighting load that corresponds to a low-end trim value; and compare the received target intensity to the retrieved low-end intensity to determine whether the received target intensity is greater than the defined threshold intensity value.

* * * * *